United States Patent
Winter et al.

(10) Patent No.: US 8,985,253 B2
(45) Date of Patent: Mar. 24, 2015

(54) GENERATORS AND VEHICLES HAVING AUXILIARY POWER GENERATION SYSTEMS

(71) Applicant: Honda Motor Co., Ltd., Minato-ku, Tokyo (JP)

(72) Inventors: Stephen F. Winter, Florence, SC (US); Kohsuke Asao, Florence, SC (US); Anthony P. Mascadri, Mechanicsburg, OH (US)

(73) Assignee: Honda Motor Co., Ltd., Tokyo (JP)

( * ) Notice: Subject to any disclaimer, the term of this patent is extended or adjusted under 35 U.S.C. 154(b) by 55 days.

(21) Appl. No.: 13/759,136

(22) Filed: Feb. 5, 2013

(65) Prior Publication Data
US 2014/0216841 A1  Aug. 7, 2014

(51) Int. Cl.
| | |
|---|---|
| *B60K 6/20* | (2007.10) |
| *H02K 7/00* | (2006.01) |
| *H02K 7/11* | (2006.01) |
| *H02K 7/18* | (2006.01) |
| *B60K 5/00* | (2006.01) |
| *H02K 9/06* | (2006.01) |

(52) U.S. Cl.
CPC . *H02K 7/003* (2013.01); *B60K 5/00* (2013.01); *H02K 7/11* (2013.01); *H02K 7/1815* (2013.01); *H02K 9/06* (2013.01); *B60Y 2200/23* (2013.01)
USPC ................... 180/65.22; 180/65.21

(58) Field of Classification Search
CPC ..... F02B 63/04; Y02T 10/7241; H02K 7/003; H02K 7/11; H02K 7/1815; H02K 9/06; B60K 5/00; B60Y 2200/23
USPC ........................ 180/291, 65.21, 65.28, 65.285
See application file for complete search history.

(56) References Cited

U.S. PATENT DOCUMENTS

| | | | |
|---|---|---|---|
| 4,398,081 A | 8/1983 | Moad | |
| 4,592,322 A | 6/1986 | Murakami et al. | |
| 4,618,043 A | 10/1986 | Hattori et al. | |
| 4,672,296 A * | 6/1987 | Griffin | 322/1 |
| 4,935,689 A | 6/1990 | Fujikawa et al. | |
| 5,293,316 A | 3/1994 | Slicker | |
| 5,323,318 A | 6/1994 | Hasegawa et al. | |
| 5,656,922 A * | 8/1997 | LaVelle et al. | 322/46 |
| 5,675,222 A | 10/1997 | Fliege | |
| 5,733,219 A | 3/1998 | Rettig et al. | |

(Continued)

FOREIGN PATENT DOCUMENTS

| | | |
|---|---|---|
| KR | 10-2011-0015832 A | 2/2011 |
| WO | 02/092376 A1 | 11/2002 |

OTHER PUBLICATIONS

Honda Motor Co., Ltd.; Owner's Manual Generator EB3000c; dated 2012; 76 pages in its entirety.

(Continued)

*Primary Examiner* — Hau Phan
*Assistant Examiner* — Jacob Meyer
(74) *Attorney, Agent, or Firm* — Ulmer & Berne LLP

(57) ABSTRACT

A vehicle includes a generator coupled with an internal combustion engine and configured to produce generated electrical power in response to operation of the internal combustion engine. The generator includes a rotor, a stator, and a clutch configured to selectively disengage the rotor. The vehicle also includes a controller coupled with the generator, a power receptacle, and an operator control device. Generators are also provided.

15 Claims, 11 Drawing Sheets

(56) References Cited

U.S. PATENT DOCUMENTS

| | | | |
|---|---|---|---|
| 5,954,781 A | 9/1999 | Slepian et al. | |
| 6,023,137 A | 2/2000 | Kumar et al. | |
| 6,111,768 A | 8/2000 | Curtiss | |
| 6,148,784 A * | 11/2000 | Masberg et al. | 123/192.1 |
| 6,149,478 A * | 11/2000 | Lehmann | 440/88 R |
| 6,157,175 A | 12/2000 | Morinigo et al. | |
| 6,182,784 B1 | 2/2001 | Pestotnik | |
| 6,202,776 B1 | 3/2001 | Masberg et al. | |
| 6,309,268 B1 * | 10/2001 | Mabru | 440/113 |
| 6,364,042 B1 | 4/2002 | Joachim | |
| 6,369,532 B2 | 4/2002 | Koenen et al. | |
| 6,494,808 B2 | 12/2002 | Lee | |
| 6,525,430 B1 | 2/2003 | Asai et al. | |
| 6,533,055 B2 | 3/2003 | Matsuura et al. | |
| 6,543,240 B2 | 4/2003 | Grafton | |
| 6,603,227 B2 * | 8/2003 | Rose, Sr. | 310/74 |
| 6,605,878 B1 * | 8/2003 | Arce | 307/64 |
| 6,616,574 B2 | 9/2003 | Jeon | |
| 6,617,725 B2 * | 9/2003 | Rose, Sr. | 310/74 |
| 6,624,533 B1 * | 9/2003 | Swanson et al. | 307/64 |
| 6,644,272 B2 | 11/2003 | Furukawa et al. | |
| 6,717,281 B1 * | 4/2004 | Brandon et al. | 290/40 C |
| 6,777,846 B2 * | 8/2004 | Feldner et al. | 310/200 |
| 6,820,576 B2 | 11/2004 | Kishibata et al. | |
| 6,836,027 B2 | 12/2004 | Lee | |
| 6,856,035 B2 * | 2/2005 | Brandon et al. | 290/40 C |
| 6,864,606 B2 | 3/2005 | Rose, Sr. | |
| 6,948,299 B2 | 9/2005 | Osborne | |
| 6,987,328 B2 | 1/2006 | Osborne | |
| 7,049,707 B2 * | 5/2006 | Wurtele | 290/1 B |
| 7,057,303 B2 * | 6/2006 | Storm et al. | 290/1 A |
| 7,130,731 B2 | 10/2006 | Itoh et al. | |
| 7,149,621 B2 | 12/2006 | Kishibata et al. | |
| 7,216,926 B2 * | 5/2007 | Hampel | 296/190.08 |
| 7,291,932 B2 * | 11/2007 | Wurtele et al. | 290/1 B |
| 7,301,247 B2 | 11/2007 | Kishibata et al. | |
| 7,337,046 B2 | 2/2008 | Minowa et al. | |
| 7,344,472 B2 | 3/2008 | Hickam | |
| 7,372,677 B2 * | 5/2008 | Kishibata et al. | 361/42 |
| 7,449,795 B2 | 11/2008 | Nelson | |
| 7,469,169 B2 * | 12/2008 | Dreibholz et al. | 701/22 |
| 7,530,345 B1 | 5/2009 | Plante et al. | |
| 7,530,623 B2 * | 5/2009 | Hampel | 296/146.11 |
| 7,582,978 B2 * | 9/2009 | Flanigan et al. | 290/1 A |
| 7,666,117 B2 | 2/2010 | Kawakami et al. | |
| 7,901,322 B2 | 3/2011 | Huen et al. | |
| 8,022,562 B2 * | 9/2011 | Inagawa et al. | 290/40 A |
| 8,050,831 B2 | 11/2011 | Martin et al. | |
| 8,091,665 B2 | 1/2012 | Kuno | |
| 8,098,054 B2 | 1/2012 | Verschuur | |
| 8,123,656 B2 | 2/2012 | Schoenek et al. | |
| 8,138,624 B2 * | 3/2012 | Yeh | 307/10.1 |
| 8,175,785 B2 | 5/2012 | Turski et al. | |
| 8,336,951 B2 * | 12/2012 | Ichihara et al. | 296/181.1 |
| 2001/0008191 A1 | 7/2001 | Smith et al. | |
| 2002/0089207 A1 * | 7/2002 | Bayerle et al. | 296/77.1 |
| 2006/0249319 A1 * | 11/2006 | Hoare et al. | 180/65.4 |
| 2007/0108857 A1 * | 5/2007 | Nomura et al. | 310/78 |
| 2008/0185860 A1 * | 8/2008 | Sersland et al. | 296/26.09 |
| 2009/0166108 A1 * | 7/2009 | Gross et al. | 180/65.21 |
| 2010/0207471 A1 | 8/2010 | Hendrickson et al. | |
| 2011/0115316 A1 * | 5/2011 | Isogai et al. | 310/71 |
| 2011/0230308 A1 | 9/2011 | Inoue et al. | |
| 2012/0028515 A1 * | 2/2012 | Stasolla et al. | 440/3 |
| 2012/0118695 A1 | 5/2012 | Kawashima et al. | |
| 2012/0193932 A1 * | 8/2012 | King | 296/26.11 |
| 2013/0168178 A1 * | 7/2013 | Takagi | 180/291 |
| 2013/0169118 A1 * | 7/2013 | Takagi | 310/60 A |
| 2014/0216399 A1 * | 8/2014 | Smith et al. | 123/376 |

OTHER PUBLICATIONS

Finlayson, P., et al.; "Cycloconverter-Controlled Synchronous Machines for Load Compensation on AC Power Systems"; IEEE Transactions on Industry Applications; Nov./Dec. 1974; pp. 806-813; vol. IA-10, No. 6.

Post, R., et al.; "A High-Efficiency Electromechanical Battery"; Proceedings of the IEEE; Mar. 1993; pp. 462-474; vol. 81, No. 3.

Akagi, H., et al.; "High-Performance Control Strategy of Cycloconverter-Fed Induction Motor Drive System Based on Digital Control Theory"; IEEE Transactions on Industrial Electronics; May 1986; pp. 126-131; vol. IE-33, No. 2.

U.S. Appl. No. 13/759,152; Titled: Methods for Adjusting Engine Throttle on Vehicle with Generator, filed Feb. 5, 2013; Inventors: Daniel E. Smith et al., in its entirety.

* cited by examiner

GENERATORS AND VEHICLES HAVING AUXILIARY POWER GENERATION SYSTEMS

TECHNICAL FIELD

Disclosed herein are generators, vehicles having auxiliary power generation systems, and related methods.

BACKGROUND

Conventional portable power generators are equipped with an internal combustion engine. Such generators can serve as an invaluable tool and can be helpful to the typical consumer under certain circumstances, particularly for activities remote from house receptacles and during emergencies during which power from the utility company is lost. For example, a homeowner can use a portable generator to operate a sump pump when power from the utility company is interrupted, thereby preventing damage from a potential flood. Despite such utility, due to the relatively large size and high cost for such a portable generator, and the relative infrequency of such emergencies, the typical consumer is often not inclined to purchase such a piece of equipment.

SUMMARY

In accordance with one embodiment, a vehicle comprises a frame, a left front wheel, a right front wheel, a left rear wheel, and a right rear wheel. The frame extends along a longitudinal axis from a front end to a rear end. The frame also extends laterally between a left side and a right side, and comprises a floor structure. The floor structure at least partially defines an occupant compartment. The left front wheel is rotatably coupled to the left side adjacent to the front end. The right front wheel is rotatably coupled to the right side adjacent to the front end. The left rear wheel is rotatably coupled to the left side adjacent to the rear end. The right rear wheel is rotatably coupled to the right side adjacent to the rear end. The vehicle also comprises a driver seat, a passenger seat, a steering wheel, an internal combustion engine, a generator, a power receptacle, an operator control device, and a controller. The driver seat and passenger seat are each coupled with the frame alongside one another at a common longitudinal position relative to the frame within the occupant compartment, and with a first one of the driver seat and the passenger seat disposed adjacent to the left side, and with a second one of the driver seat and the passenger seat disposed adjacent to the right side. The steering wheel is disposed within the occupant compartment and is coupled with each of the left front wheel and the right front wheel, and is configured to facilitate steering of the left front wheel and the right front wheel by a driver seated in the driver seat. The internal combustion engine is coupled to the frame and is selectively drivingly coupled with at least one of the left front wheel, the right front wheel, the left rear wheel, and the right rear wheel to facilitate propulsion of the vehicle along a ground surface. The generator is coupled with the internal combustion engine and is configured to produce generated electrical power in response to operation of the internal combustion engine. The generator comprises a rotor, a stator, and a clutch configured to selectively disengage the rotor. The controller is coupled with each of the generator, the power receptacle, and the operator control device. The controller is configured to receive the generated electrical power from the generator and to be controlled by the operator control device to provide conditioned electrical power to the power receptacle. The conditioned electrical power comprises alternating current of between about 100 volts and about 500 volts and has a frequency of between about 40 hertz and about 70 hertz.

In accordance with another embodiment, a generator is configured for coupling with an internal combustion engine. The generator comprises a shaft, a housing, a first bearing, a rotor, a stator, and a clutch. The shaft extends between a first end and a second end. The housing comprises an end plate and a side wall structure. The first bearing couples the first end of the shaft with the end plate. The rotor is rotatable relative to the housing and defines a rotor bore. The stator is fixed relative to the housing and defines a stator bore. The clutch is coupled with each of the shaft and the rotor, is disposed adjacent to the first end of the shaft, and is configured to selectively engage the shaft with the rotor. The shaft extends through each of the rotor bore and the stator bore. At least one of the rotor and the stator is disposed adjacent to the second end of the shaft. The second end of the shaft is configured for coupling to a power take off of an internal combustion engine when the housing is bolted to a block of an internal combustion engine.

BRIEF DESCRIPTION OF THE DRAWINGS

Various embodiments will become better understood with regard to the following description, appended claims and accompanying drawings wherein:

DETAILED DESCRIPTION

Certain embodiments are hereinafter described in detail in connection with the views and examples of FIGS. 1-8, 9A and 9B. A vehicle in accordance with one embodiment can include an auxiliary power generation system. The auxiliary power generation system can be configured to provide power of a type and quantity as can typically be accessed by a consumer from a wall outlet or other such receptacle or source that is powered by a land-based power source and present in a residential, commercial or industrial building or other structure. As will be appreciated with respect to the following, the auxiliary power generation system can include an outlet or receptacle that is identical to, or similar to, the type of wall outlet or receptacle as would be present in the residential, commercial or industrial building. In such a configuration, a plug of an electrical device (e.g., a power tool, electric pump, or television) can just as easily and interchangeably interface the outlet or receptacle of the auxiliary power generation system, as it can the wall outlet or other such receptacle or source that is present in a residential, commercial or industrial building. The auxiliary power generation system can accordingly provide an operator with the convenience of having mobile access to such power, to facilitate convenient and effective use of an electrical device even when remote from a residential, commercial or industrial building or other conventional land-based power source.

Figure 1:
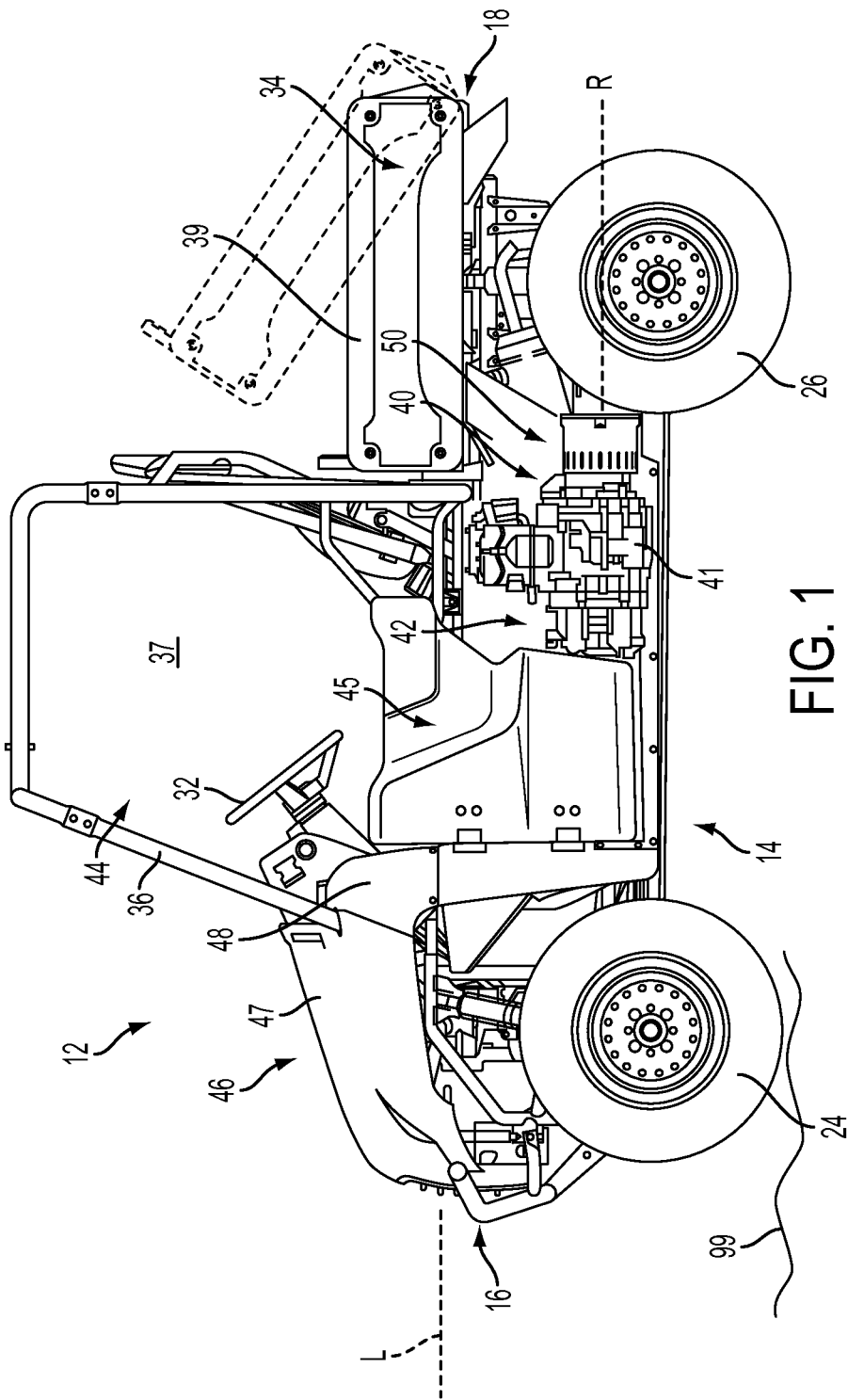
FIG. 1 is side elevational view depicting a multi-use vehicle ("MUV") having an auxiliary power generation system in accordance with one embodiment, wherein a portion of the left side of the vehicle is broken out for clarity such that an internal combustion engine and generator can be seen.
Figure 2:
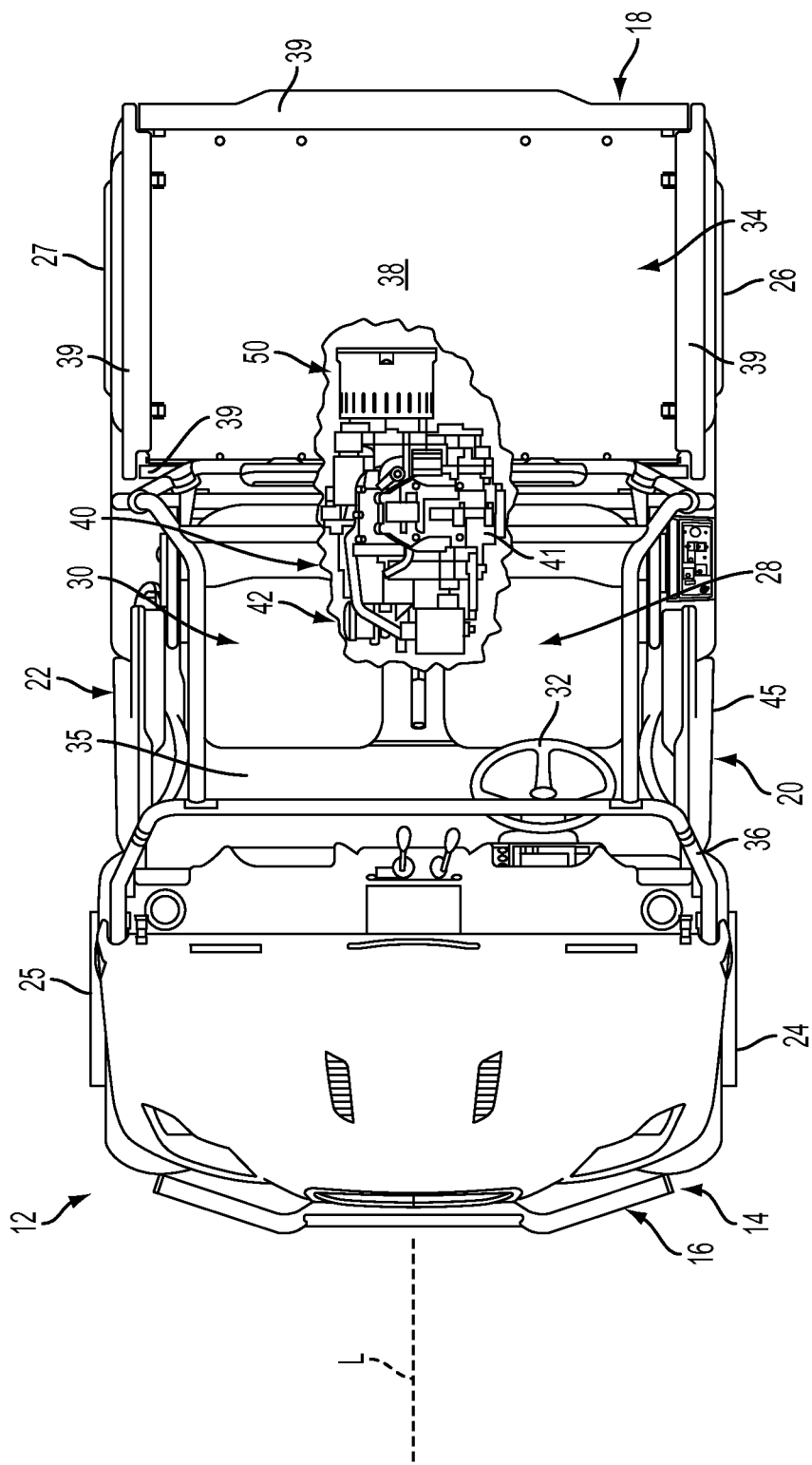
FIG. 2 is a top plan view depicting the vehicle of FIG. 1, wherein a portion of the vehicle is broken out for clarity such that the internal combustion engine and generator can be seen.

The auxiliary power generation system can be provided upon a vehicle, such as vehicle 12 in FIGS. 1-2, in addition to an existing charging system present on the vehicle. It will be understood that the existing charging system can include a battery, magneto, alternator, starter, lighting, and/or other electrical components typical of a conventional vehicle, that are present to facilitate operation of the vehicle's internal combustion engine and/or driving of the vehicle upon a ground surface, for example. Therefore, it will be appreciated that an auxiliary power generation system can be added to an existing conventional vehicle as a modular or aftermarket system, and in some cases without requiring removal or replacement of other components of the vehicle. It will also therefore be appreciated that an auxiliary power generation system can be removed from a vehicle, while allowing the vehicle to remain fully operative for its primary functional purpose, namely as for vehicle 12 to drive over a ground surface 99.

The vehicle 12 is shown to comprise an MUV, a side-by-side type of utility vehicle ("UTV") in which a driver seat 28 and passenger seat 30 are oriented side-by-side, as best shown in FIG. 2. Although the vehicle 12 is shown to include only one row of seats (i.e., 28 and 30), it will be appreciated that, in alternative embodiments, a vehicle can include two, three or more rows of seats. Referring more particularly to the vehicle 12 of FIGS. 1-2, it can be seen that the vehicle 12 includes a frame 14 extending along a longitudinal axis "L" from a front end 16 to a rear end 18, and extending laterally between a left side 20 and a right side 22. A left front wheel 24 is shown to be rotatably coupled to the left side 20 adjacent to the front end 16. A right front wheel 25 is shown to be rotatably coupled to the right side 22 adjacent to the front end 16. A left rear wheel 26 is shown to be rotatably coupled to the left side 20 adjacent to the rear end 18. A right rear wheel 27 is shown to be rotatably coupled to the right side 22 adjacent to the rear end 18. It will be appreciated that, in other embodiments, a vehicle can include fewer or more than four wheels, provided in any of a variety of alternative suitable configurations. In one embodiment, a hitch (not shown), such as for towing a trailer, can be attached to the rear end 18 of the frame 14.

The frame 14 is also shown to comprise a floor structure 35 and a roll cage 36. The floor structure 35 can comprise a floor surface that extends along a floor plane "F", shown in FIG. 4, for supporting feet of a driver seated in the driver seat 28. This same floor surface can also support feet of a passenger seated in the passenger seat 30. The roll cage 36 is shown to cooperate with the floor structure 35 and/or other components of the vehicle 12 to define an occupant compartment 37 (FIG. 1). It will be appreciated that the occupant compartment 37 can comprise a space within which a seated driver and passenger are intended to remain completely within during movement of the vehicle 12.

Figure 3:
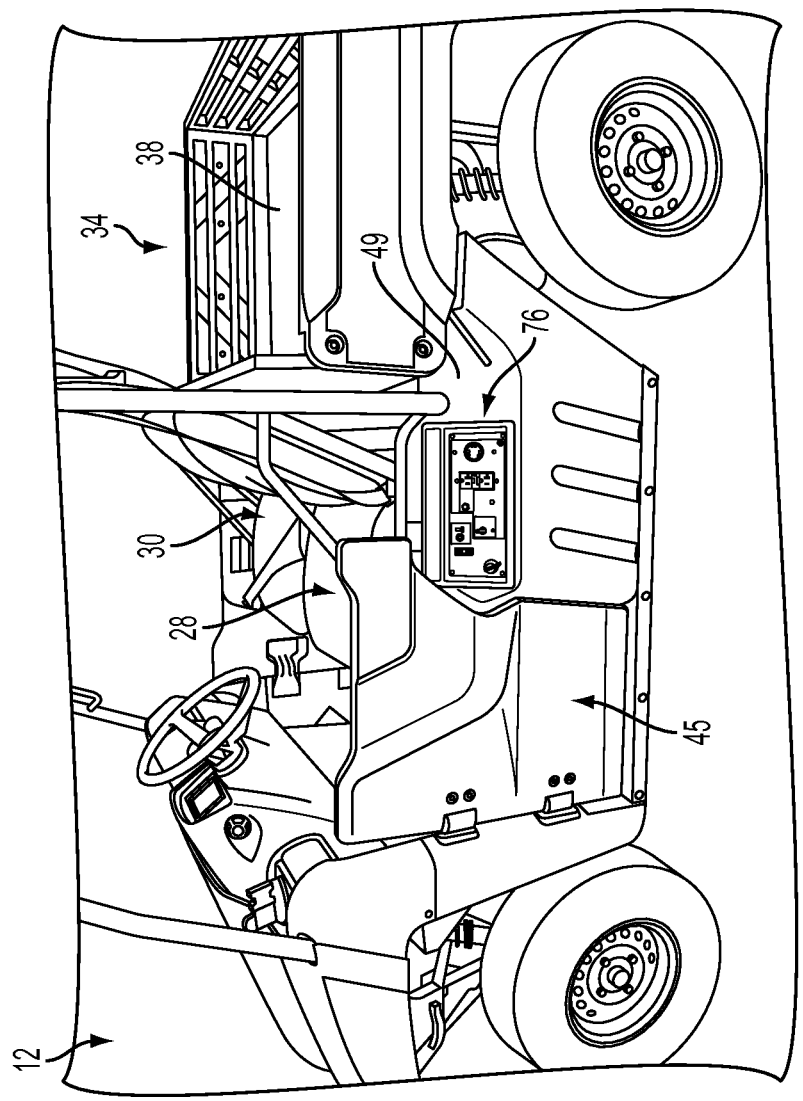
FIG. 3 is a top side perspective view depicting a portion of the vehicle of FIG. 1.
Figure 4:
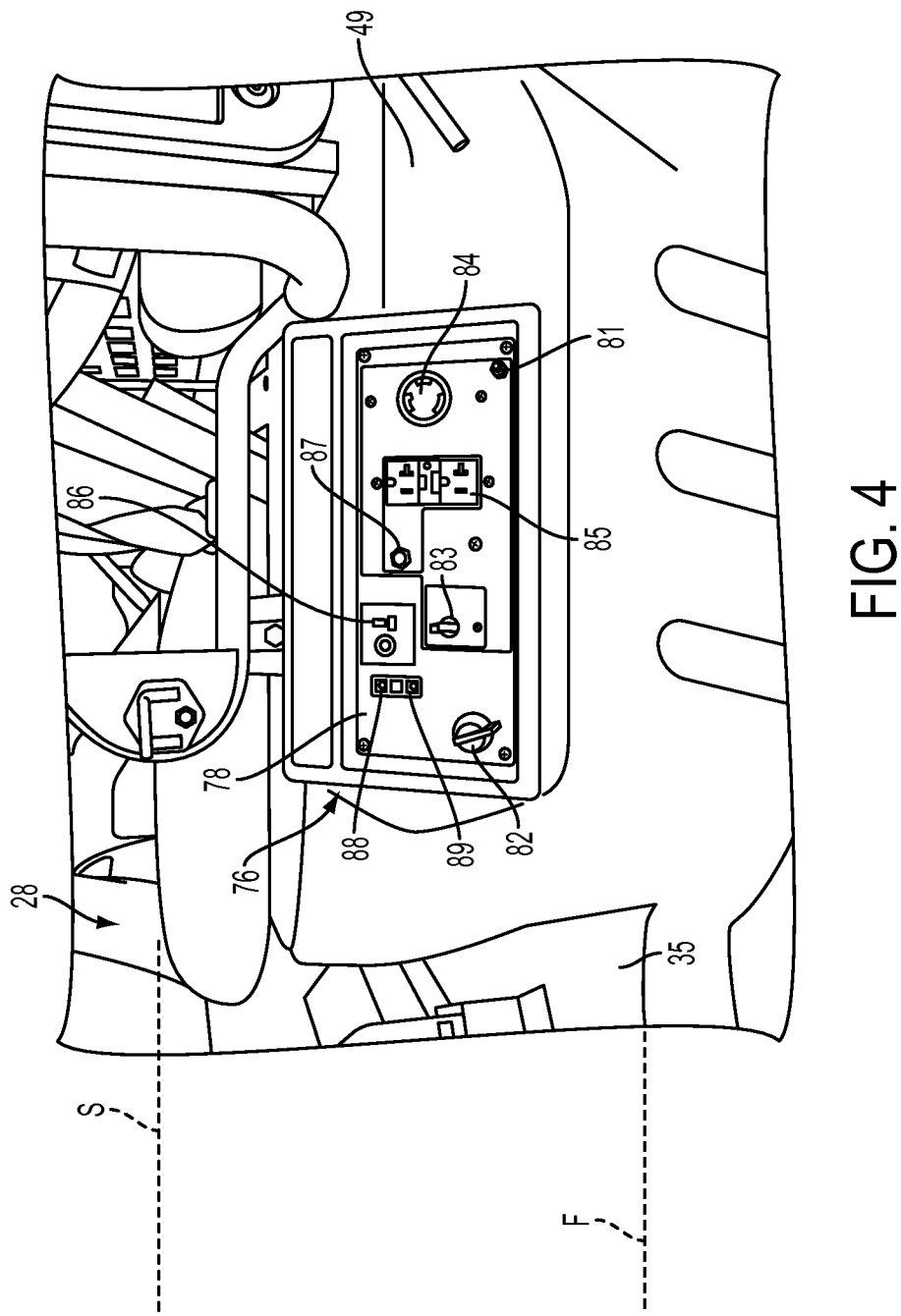
FIG. 4 is an enlarged top side perspective view depicting a portion of the vehicle of FIG. 3, wherein a left side door of the vehicle is opened and not shown.
Figure 5:
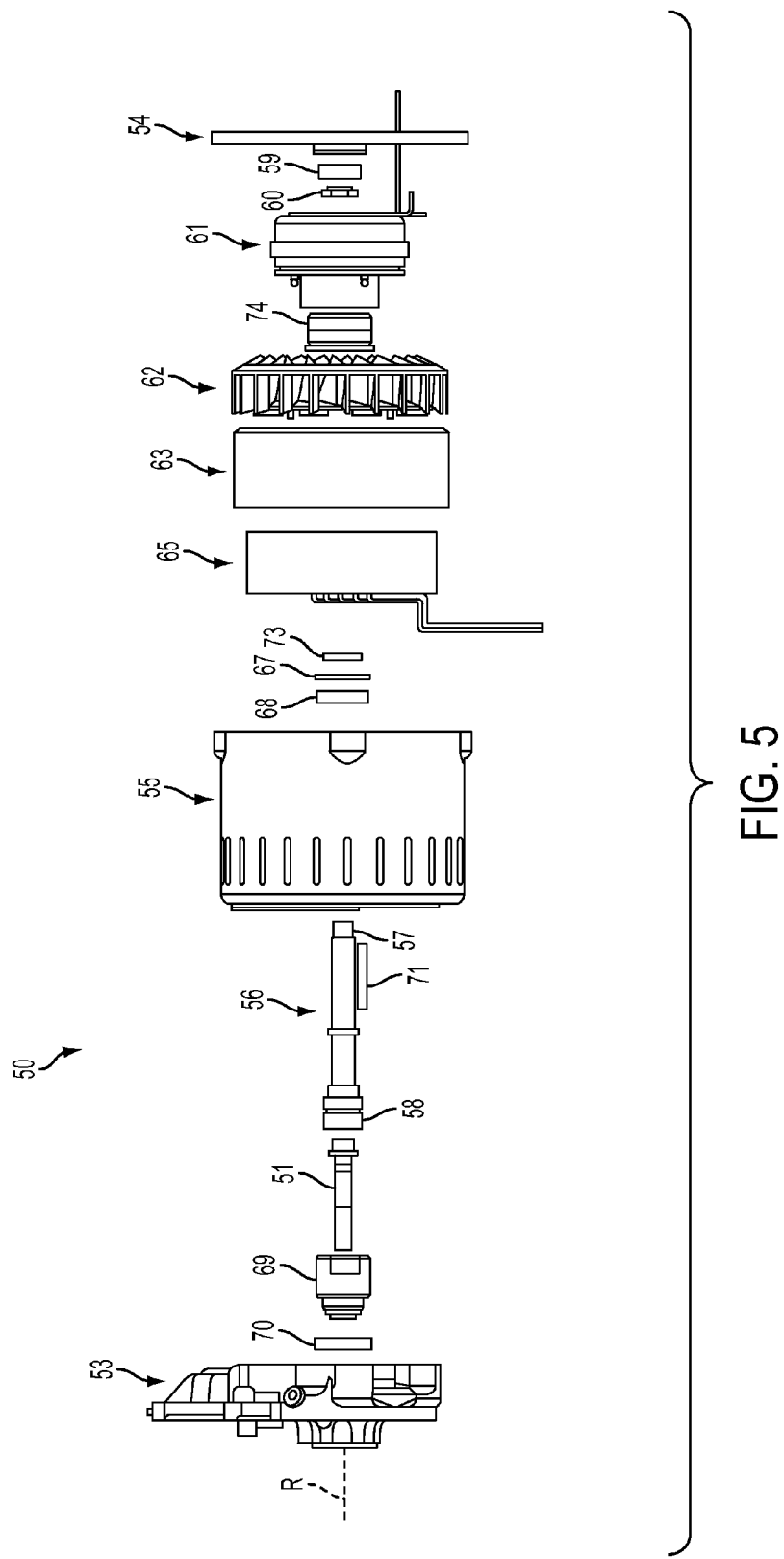
FIG. 5 is an exploded side elevational view depicting selected components of the generator of FIG. 1.

The driver seat 28 and the passenger seat 30 are shown to be coupled with the frame 14 alongside one another at a common longitudinal position (i.e., side-by-side) relative to the frame 14 within the occupant compartment 37. The driver seat 28 can comprise a generally horizontal seating surface that extends along a support plane "S" as shown in FIG. 4, for supporting the buttocks and lower back of a seated driver. In the embodiment shown in FIGS. 1-4, the passenger seat 30 can also comprise a generally horizontal seating surface that extends along the support plane S, for supporting the buttocks and lower back of a seated passenger. The support plane S can be generally horizontal and parallel with the floor plane F, as shown in FIG. 4. The driver seat 28 is shown to be adjacent to the left side 20, and the passenger seat 30 is shown to be adjacent to the right side 22. It will be appreciated that, in another embodiment, the driver seat can be adjacent to the right side, and the passenger seat can be adjacent to the left side. A steering wheel 32 can be disposed within the occupant compartment 37 adjacent to the driver seat 28. In one embodiment, the steering wheel 32 can be coupled with each of the left front wheel 24 and the right front wheel 25, to facilitate steering thereof by a driver seated in the driver seat 28.

The vehicle 12 is additionally shown to comprise a body 46 (FIG. 1). The body 46 can include a plurality of body panels, e.g., 47, 48, and 49, that are formed from plastic, metal, fiberglass or some other material, and are attached directly or indirectly to the frame 14 such as with fasteners, welding, interlocking mechanical features, or otherwise. At least one of the body 46 and the frame 14 defines an opening 44 to facilitate ingress and egress of at least one of a driver and a passenger relative to the occupant compartment 37. The opening 44 is shown in FIG. 1 to be disposed at a longitudinal position relative to the frame 14 generally midway between the front end 16 and the rear end 18, and on the left side 20. It will be appreciated that a similar opening can be provided on the right side 22. One or more blocking members, such as a door (e.g., 45) and/or net (not shown) can be provided to selectively block at least portion of each of these openings (e.g., 44), to prevent ingress and egress of at least one of a driver and a passenger relative to the occupant compartment 37.

The vehicle 12 is also shown to comprise a utility bed 34. The utility bed 34 is shown in FIG. 2 to be coupled with the frame 14 at a longitudinal position rearward of the driver seat 28 and the passenger seat 30. The utility bed 34 can include a cargo support surface 38 that is configured to support cargo and, in the example of FIGS. 1-2, can include one or more side walls 39 to define a cargo box. In one embodiment, the cargo support surface 38 can extend generally along the support plane S. The side walls 39 can be selectively pivotal or collapsible relative to the cargo support surface 38, or alternatively can be fixed in place. In alternative embodiments, a utility bed might include fewer or no side walls. In one embodiment, the utility bed 34 is movably coupled with the frame 14 such that the utility bed 34 is pivotable between a dumping position (shown in dashed lines in FIG. 1) and a cargo carrying position (shown in solid lines in FIG. 1). However, alternatively, a utility bed can be rigidly and immovably fixed to a frame of a vehicle.

The vehicle 12 can further include an internal combustion engine 40 that can be coupled with the frame 14. The engine 40 can be provided at any of a variety of suitable locations upon the vehicle 12. In one embodiment, as shown in FIGS. 1-2, at least a portion of the engine 40 is disposed beneath the driver seat 28 and the passenger seat 30 and at a lateral position relative to the frame 14 generally midway between the left side 20 and the right side 22. The engine 40 can be configured to convert fuel into mechanical and/or electrical energy. In one embodiment, the engine 40 can be configured to consume gasoline, however, in other embodiments, the engine 40 can be configured to consume diesel fuel, propane, fuel oil, natural gas, alcohol, kerosene, and/or another suitable fuel or combination thereof. The engine 40 can be selectively drivingly coupled with one or more of the left front wheel 24, the right front wheel 25, the left rear wheel 26, and the right rear wheel 27, such as with a transmission (e.g., generally shown at 42), one or more gear boxes, clutches, differentials, belts, tapes, chains, and/or axles, for example, to facilitate propulsion of the vehicle 12 along the ground surface 99. Among other components standard to a conventional internal combustion engine, the engine 40 can include an engine block 41 and a crankshaft 43 (see FIG. 6) that can be rotatably supported by the engine block 41. The engine 40 can also include a power take off to facilitate powering of an auxiliary device. In one example, the power take off can comprise a portion of the crankshaft 43 which, in the example of FIGS. 1-2, can extend rearwardly from the engine 40. In another example, the power take off can comprise a different type of mechanical interface, such as a sprocket or shaft, that itself is coupled directly or indirectly with the crankshaft 43 to rotate in 1:1 or other correspondence with the crankshaft 43.

The auxiliary power generation system of the vehicle 12 can include a generator 50 that can bolted or otherwise coupled, as a modular component, with the engine 40. In one embodiment, the generator 50 can be attached to the engine 40 such that the generator 50 can be easily removed from the engine 40 through use of tools, with the engine 40 and vehicle 12 still being capable of driving despite removal of the generator 50. The generator 50 can be configured to produce generated electrical power in response to operation of the engine 40. It will be appreciated that the generator 50 can be configured to produce alternating current or direct current. Alternating current, as used herein, shall not be limited to a true sinusoidal waveform, but shall also include waveforms having a simulated, approximated, or artificial sinusoidal or fluctuating waveform including, for example, those generated through pulse width modulation or other switching of thyristors, source controlled rectifiers, insulated gate bipolar transistors, other transistors, or other electronic, mechanical, or electromechanical components.

Figure 6:
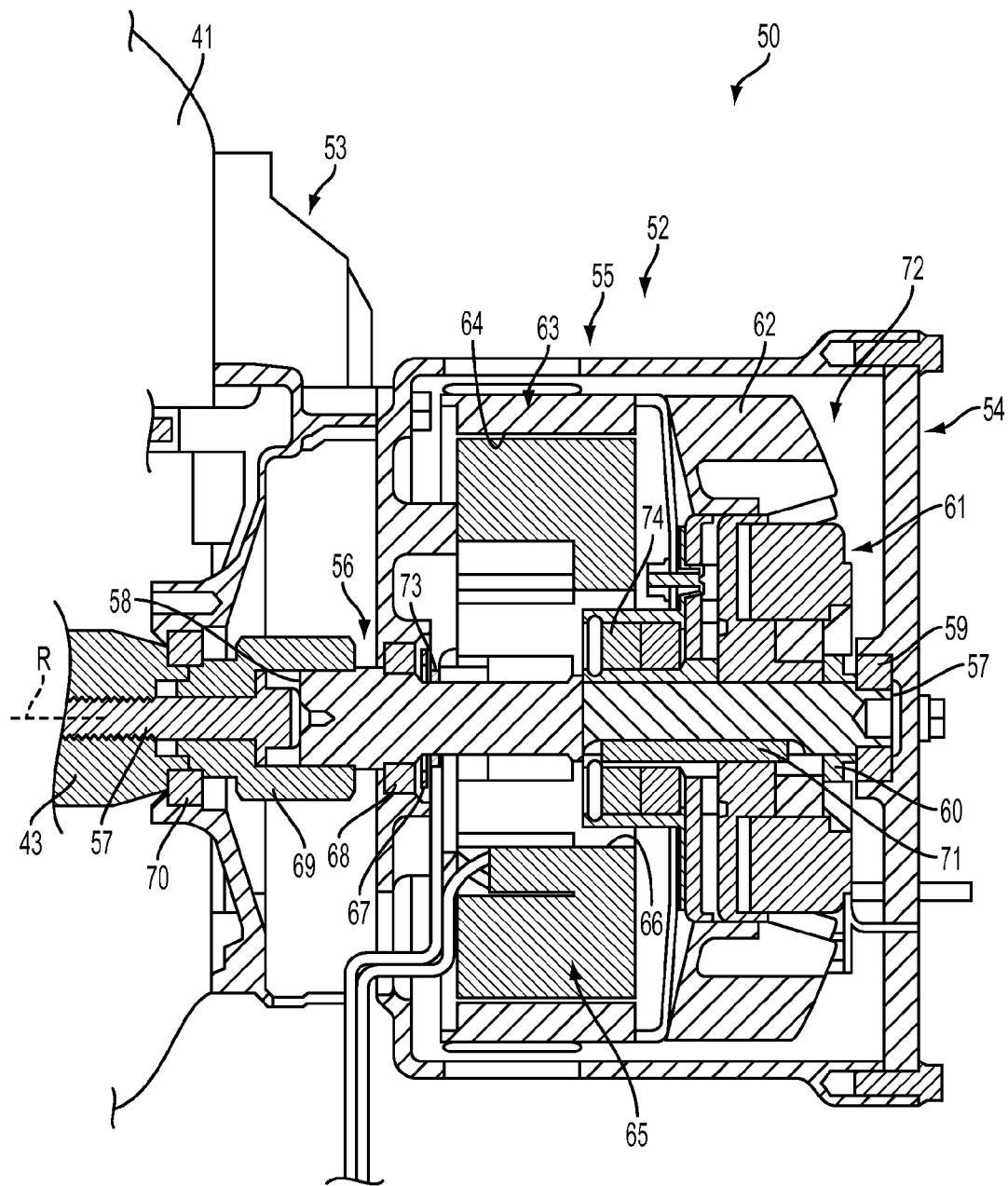
FIG. 6 is a side elevational cross-sectional view depicting the generator of FIG. 1 in combination with a portion of a crankshaft of the internal combustion engine of FIG. 1.

In one embodiment, the generator 50 can be attached to the engine 40 such that the generator 50 is disposed at a longitudinal position relative to the frame 14 rearward of one or both of the driver seat 28 and the passenger seat 30, and with at least a portion of the generator 50 disposed beneath the cargo support surface 38 of the utility bed 34, as in the embodiment of FIGS. 1-2. As further shown in FIG. 2, the generator 50 can be disposed at a lateral position relative to the frame 14 generally midway between the left side 20 and the right side 22. As described further below, the generator 50 can include a rotor 63 (FIG. 5) which is rotatable about a rotational axis "R". The rotational axis R can be parallel with the longitudinal axis L of the vehicle 12, as shown in FIG. 1. As shown in FIG. 6, the crankshaft 43 can also be rotatable about the rotational axis R, though in other embodiments, it will be appreciated that the crankshaft 43 can be rotatable about an axis parallel with the rotational axis R, or transverse to the rotational axis R. In yet further embodiments, it will be appreciated that a rotor of a generator can be rotatable about an axis transverse to the longitudinal axis of a vehicle.

The generator 50 can be provided in any of a variety of suitable arrangements. In one embodiment, with reference to FIGS. 5-6, the generator 50 can include the rotor 63, a stator 65, a shaft 56, a clutch 61, a fan 62, and a housing 52. The rotor 63 can incorporate permanent magnets or other magnetic flux-inducing elements. The stator 65 can comprise a coil assembly having a plurality of windings of electrical wire (e.g., 120, 121 and 123 in FIG. 8) spaced from, but in electromagnetic relationship with, the rotor 63, as the rotor 63 rotates relative to the stator 65. In operation, the coil assembly of the stator 65 can experience a magnetic field developed by the magnets or other elements of the rotor 63, and can convert this magnetic field into electrical power for transmission to other components of the auxiliary power generation system.

The housing 52 can include a mounting plate 53, an end plate 54, and a side wall structure 55 which, when assembled, can cooperate to define an internal cavity 72. In one embodiment, the side wall structure 55 can be generally annular, and can extend between and contact each of the mounting plate 53 and the end plate 54, as shown in FIG. 6. When assembled, the side wall structure 55 can be attached to each of the mounting plate 53 and the end plate 54 with fasteners such as bolts.

The shaft 56 of the generator 50 is shown to extend between a first end 57 and a second end 58. The generator 50 can include a bearing 59 that couples the first end 57 of the shaft 56 with the end plate 54, for rotatable support. The generator 50 can also include a bearing 68 that couples the second end 58 of the shaft 56 with the mounting plate 53, for rotatable support. A nut 60 can be provided on the first end 57 of the shaft 56, and a circlip 67 or other retention ring can be provided near the second end 58 of the shaft 56, which together can cooperate with other components to maintain assembly and a desired axial position of components of the generator 50. A spacer washer 73 can be provided on the shaft 56 adjacent to the circlip 67, as generally shown.

The rotor 63 can be rotatable relative to the housing 52 and can define a rotor bore 64. The stator 65 can be fixed relative to the housing 52 and can define a stator bore 66. The rotor 63 and the stator 65 are shown to be arranged in FIG. 6 such that the shaft 56 extends through each of the rotor bore 64 and the stator bore 66, and such that the stator 65 is disposed at least substantially within the rotor bore 64, concentrically between the shaft 56 and the rotor 63. In this configuration, both the rotor 63 and the stator 65 are shown to be disposed adjacent to the second end 58 of the shaft 56. In other embodiments, positions of a rotor and a stator of a generator can be reversed or otherwise oriented.

In one embodiment, as shown in FIG. 6, the clutch 61 can be disposed adjacent to the first end 57 of the shaft 56. The clutch 61 can be coupled with each of the shaft 56 and the rotor 63, and can be configured to selectively engage the shaft 56 with the rotor 63, and to selectively disengage the rotor 63 from the shaft 56. More particularly, a radially inner member of the clutch 61 is shown in FIG. 6 to be fixed in position relative to the shaft 56 by a key 71. A radially outer member of the clutch 61 can be fixed to the fan 62, which in turn can be fixed to the rotor 63. A clutch bearing 74 can be provided to facilitate support of the clutch 61 relative to the shaft 56. As shown in FIG. 6, the fan 62 can be disposed adjacent to the first end 57 of the shaft 56 and coupled with each of the clutch 61 and the rotor 63. In other embodiments, a fan might be positioned differently within a generator or not provided at all, and a radially outer member of a clutch can be fixed directly to a rotor.

The clutch 61 can be configured such that it can be selectively engaged and disengaged. When the clutch is engaged, the radially inner and outer members of the clutch 61 rotate together, resulting in the rotor 63 rotating together with the shaft 56 relative to the housing 52. When the clutch 61 is disengaged, the radially inner member of the clutch 61 is free to rotate with respect to the radially outer member of the clutch 61, resulting in the rotor 63 being stationary relative to the housing 52 despite rotation of the shaft 56. An actuator can be provided to cause the selective engagement and disengagement of the clutch. In one embodiment, the clutch 61 comprises an electromagnetic clutch in which the actuator comprises an electric solenoid or coil (identified as 61 in FIG. 7) which, when energized, causes engagement of the clutch 61 and, when de-energized, causes disengagement of the clutch 61. In other embodiments, the actuator can comprise an electric motor, a pneumatic or hydraulic cylinder, a mechanical linkage, or otherwise. It will be appreciated that the clutch 61 can be disengaged when the generator 50 is not needed to generate power, such as during driving of the vehicle 12, thereby then reducing the rotational mass coupled with the engine 40 (by not rotating the fan 62 and the rotor 63).

Once assembled, the generator 50 can be attached to the engine 40. More particularly, bolts or other fasteners can be used to attach the generator 50 to the engine 40 (e.g., to the back side of the engine block 41, as shown in FIGS. 1-2), such that the mounting plate 53 of the housing 52 is attached to and contacts the engine block 41, and such that the second end 58 of the shaft 56 is coupled with the crankshaft 43 or other power take off of the engine 40. In the example of FIG. 6, the generator 50 is shown to further include a joint 69 which is shown to be supported relative to the mounting plate 53 by a bearing 70. The joint 69 can couple together the second end 58 of the shaft 56 and the crankshaft 43 or other power take off, such as through contact with each of the second end 58 of the shaft 56 and the crankshaft 43. More particularly, a bolt 51 can pass through an aperture in the joint 69 and into a threaded aperture in the crankshaft 43, as shown in FIG. 6, to facilitate coupling of the joint 69 with the crankshaft 43. In one embodiment, the joint 69 can be splined or otherwise non-rotatably coupled relative to the crankshaft 43 and/or the second end 58 of the shaft 56, such that the crankshaft 43, the joint 69, and the shaft 56 rotate together. It will be appreciated that a generator of an auxiliary power generation system be provided in any of a variety of alternative suitable configurations.

Figure 10:
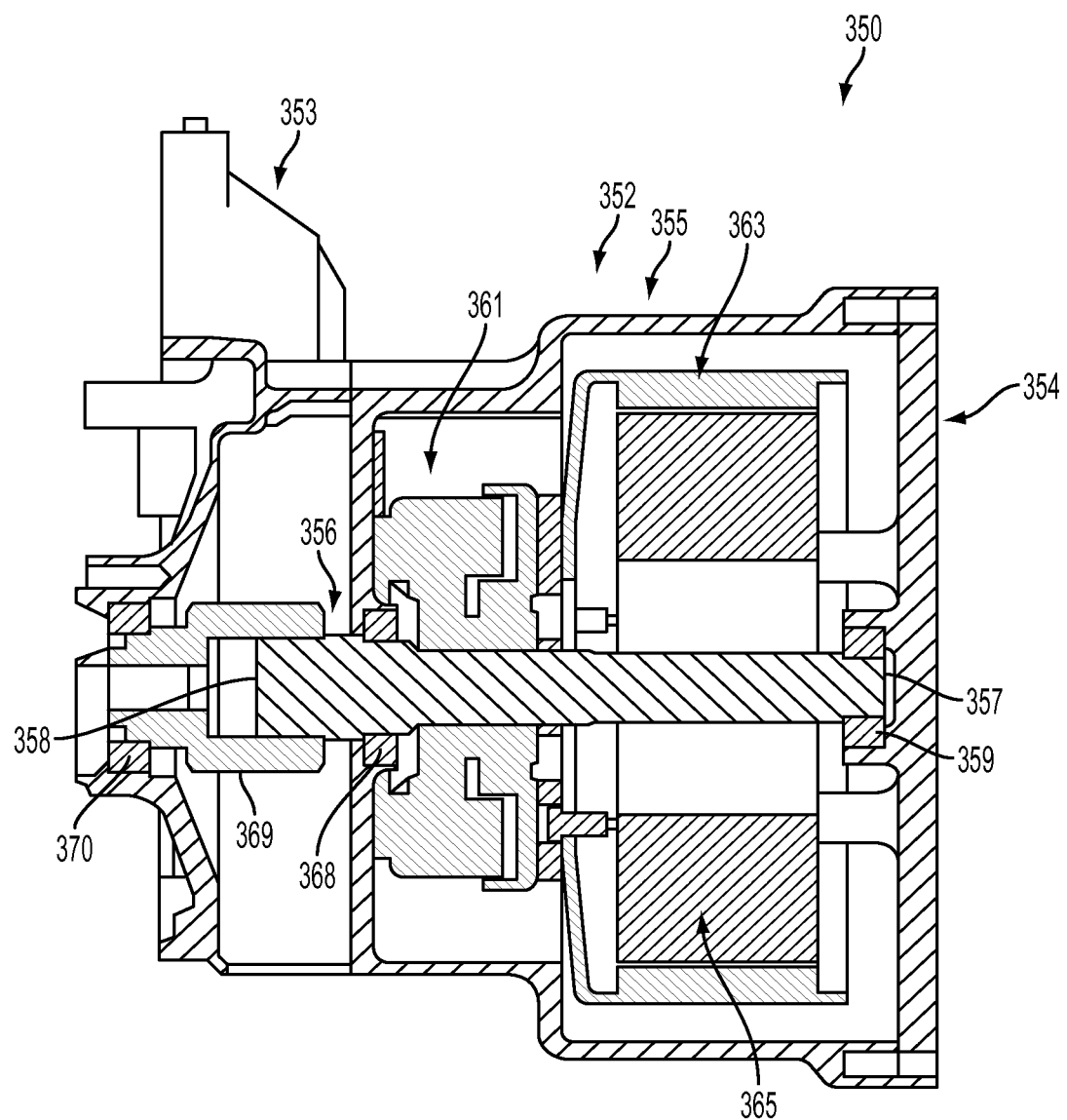
FIG. 10 is a side elevational cross-sectional view depicting a conventional generator.

It can be seen in FIG. 6 that, when the generator 50 is attached to the engine 40, the rotor 63 and the stator 65 can be interposed between the engine block 41 and the clutch 61. It will be appreciated that this configuration can provide certain advantages such as, for example, providing a space efficient, weight efficient, performance enhanced, and cost efficient configuration for the generator 50 as compared, for example, to certain conventional generator designs. One such conventional generator 350 is generally shown in FIG. 10. The generator 350 includes a housing 352, a shaft 356, a clutch 361, a rotor 363, and a stator 365. The housing 352 includes a mounting plate 353, an end plate 354, and a side wall structure 355, which together cooperate to form a cavity within which the clutch 361, the rotor 363, and the stator 365 reside. The shaft 356 extends from a first end 357 to a second end 358. A bearing 359 rotatably supports the first end 357 of the shaft 356 relative to the end plate 354. A bearing 368 rotatably supports the second end 358 of the shaft 356 relative to the mounting plate 353. A joint 369 is provided to couple the shaft 356 with a crankshaft (not shown) of an engine, and is rotatably supported by a bearing 370 relative to the mounting plate 353. Other features of the generator 350 will be appreciated with reference to FIG. 10. It will be appreciated with reference to FIG. 10 that, when the generator 350 is attached to an engine block of an engine, the clutch 361 is interposed between the engine block and both the rotor 363 and the stator 365. In other embodiments, however, it will be appreciated that a generator of an auxiliary power generation system might not have a rotor and stator interposed between an engine block and clutch, but can be provided in any of a variety of other suitable configurations.

Figure 7:
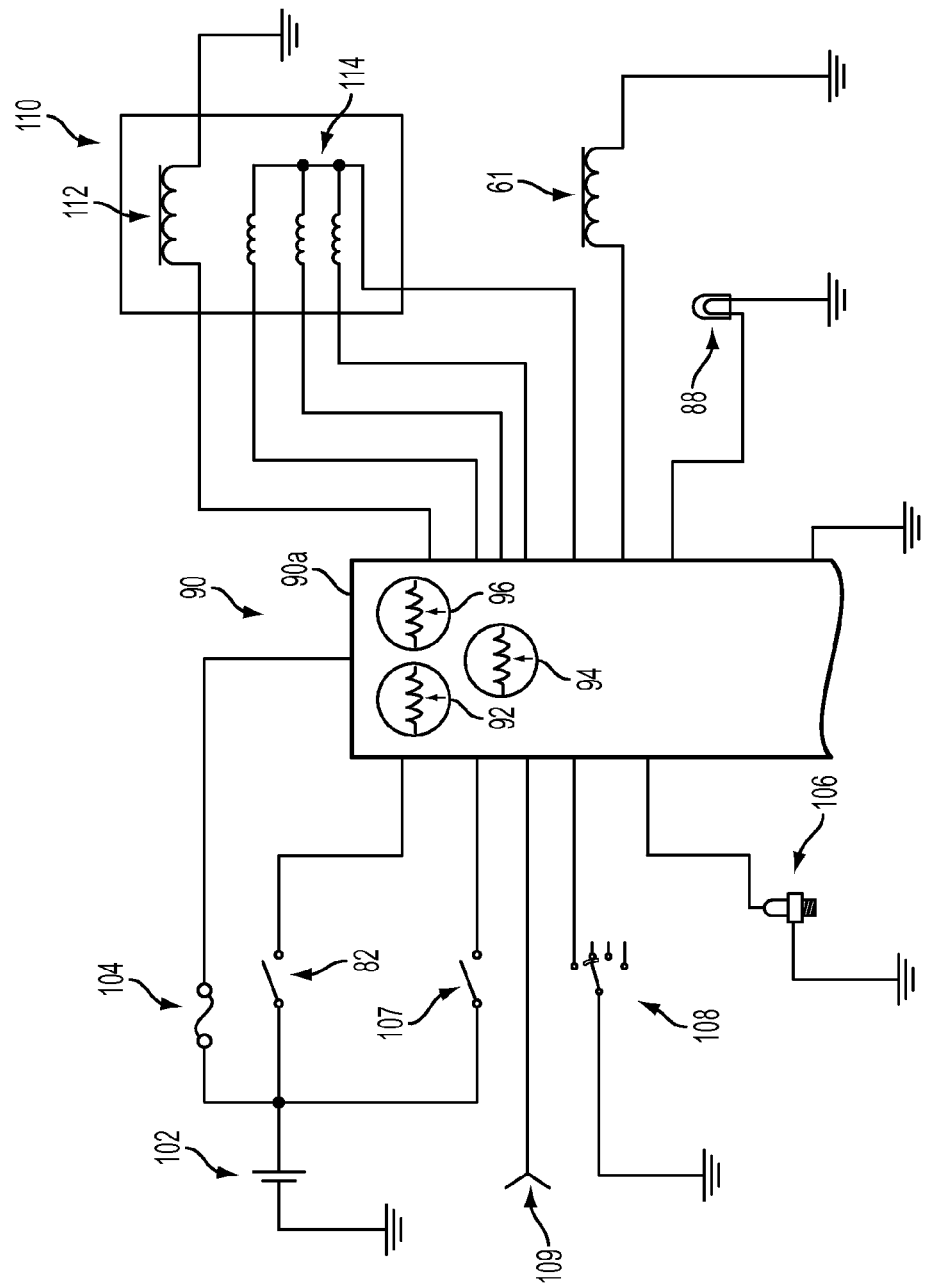
FIGS. 7-8 are schematic views that together illustrate components of the power generation system of the vehicle of FIG. 1.
Figure 8:
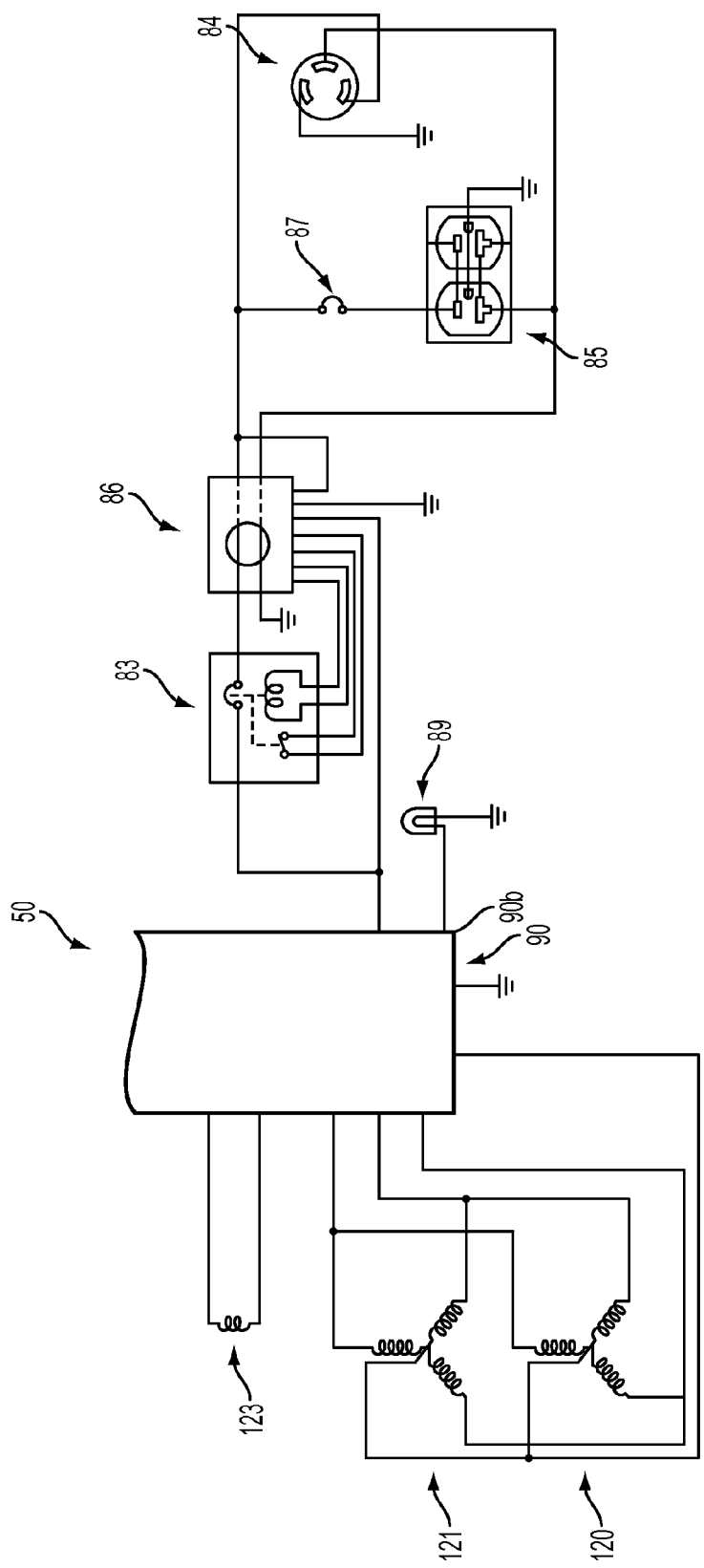

In addition to the generator 50, the auxiliary power generation system of the vehicle 12 can also include a generator control panel 76 (FIGS. 3-4) and a controller 90 (FIGS. 7-8). The generator control panel 76 can include or support various control devices and power receptacles of the auxiliary power generation system as would typically need to be accessible by an operator of the auxiliary power generation system. In one embodiment, the generator control panel 76 can support all such control devices and power receptacles of an auxiliary power generation system at a central location, such as shown in FIGS. 1-4. For example, the generator control panel 76 is shown in FIG. 4 to support a ground lug 81, an operator control device 82, power receptacles 84 and 85, indicator lights 88 and 89, and several circuit protection devices. Such circuit protection devices are shown to include circuit breakers 83 and 87 and a ground fault circuit interrupter 86. Alternatively, control devices and power receptacles of an auxiliary power generation system can be distributed among multiple locations on a vehicle.

The generator control panel 76 can be attached to at least one of the frame 14 and the body 46 of the vehicle 12 in any of a variety of suitable arrangements and positions. In one example, as shown in FIGS. 1-4, the generator control panel 76 is shown to be attached to the body panel 49. The generator control panel 76 is shown to be positioned at a longitudinal position that is entirely forward of the utility bed 34, and adjacent to and at a longitudinal position rearward of the door 45 (e.g., even when the door is in a closed position as shown in FIG. 3). The generator control panel 76 is also shown to be positioned at a longitudinal position that is adjacent to and rearward of a corresponding vertical portion of the opening 44. The generator control panel 76 is shown in FIG. 4 to be positioned at a vertical position at least substantially entirely above the floor plane F and at least substantially entirely beneath the support plane S. The generator control panel 76 is shown in FIG. 3 to be positioned at a lateral position generally beside and laterally outwardly of the driver seat 28, such that a front surface 78 of the generator control panel 76 faces laterally outwardly of the vehicle 12. It will be appreciated that, in an alternative embodiment, a generator control panel (similar to 76) can additionally or alternatively be provided in a similar position as the generator control panel 76, except generally beside and laterally outwardly of the passenger seat 30.

The controller 90 can comprise an electronic control unit or other arrangement that is centrally located on the vehicle 12, or alternatively that includes respective components that are distributed among several distinct locations upon the vehicle. In the example of FIGS. 7-8, the controller 90 is shown to be a single unit which can be located at any of a variety of locations on the vehicle 12. In one embodiment, the controller 90 can be disposed laterally inward of the front surface 78 of the generator control panel 76.

The controller 90 can be provided in any of a variety of suitable configurations. For example, the controller 90 is shown in FIGS. 7-8 to include a control portion 90*a* and a conditioning portion 90*b*. While the control portion 90*a* and the conditioning portion 90*b* are shown to be part of a common module, it will be appreciated that a control portion of a controller can alternatively be positioned remotely from a conditioning portion of a controller but connected together with electrical wiring. The conditioning portion 90b of the controller 90 can be generally configured to selectively receive generated electrical power from the generator 50, condition that electrical power, and provide that conditioned electrical power to the power receptacles 84 and 85, under the direction and control of the control portion 90a of the controller 90, as described further below.

The control portion 90a of the controller 90 is shown in FIG. 7 to be coupled with a battery 102 of the vehicle 12, by way of a fuse 104 or other circuit protector, to facilitate powering of the controller 90. In other embodiments, in which the vehicle does not include a battery, the controller can be powered by an existing charging system present on the vehicle, or can be powered by a generator of the auxiliary power generation system. The control portion 90a is also shown to be coupled with a parking brake switch 107, such that the controller 90 can determine when a parking brake of the vehicle 12 is engaged and disengaged.

Additionally, the control portion 90a can be coupled with the transmission 42 of the vehicle 12, and more particularly a gear position switch 108. The controller 90 can determine from the gear position switch 108 whether the transmission 42 is in an appropriate gear or position to facilitate operation of the auxiliary power generation system. More particularly, in one embodiment, the controller 90 can determine from the gear position switch 108 whether the transmission is in a neutral position. In another embodiment, a controller can determine from a gear position switch whether the transmission is in a park position, and/or in a forward or reverse drive gear.

The control portion 90a of the controller 90 can also be configured to determine a rotational speed of the crankshaft 43 of the engine 40. In one embodiment, as shown in FIG. 7, the controller 90 can be coupled with a spark plug 106 or associated solenoid or spark controller of the engine 40, wherein the rotational speed of the crankshaft 43 can be determined based upon the number of detected voltage pulses (corresponding with sparks of the spark plug 106) in a given time. In other embodiments, a controller can alternatively or additionally be coupled with a rotary encoder, crankshaft position sensor, or other such device to facilitate its determination of the rotational speed of an engine's crankshaft.

The control portion 90a of the controller 90 is shown in FIG. 7 to be coupled with the operator control device 82 which is shown in FIGS. 4 and 7 to comprise an off/on type switch having a rotatable knob. It will be appreciated that an operator control device can comprise any of a variety of other devices including, for example, a latching or non-latching pushbutton, a slide-type switch, a toggle-type switch, or a relay, soft contact, or other circuit actuated by a touch screen or other such operator interface.

The control portion 90a can also receive signals from one or more other systems on the vehicle 12, such as by way of one or more auxiliary inputs (e.g., 109 in FIG. 7). Such signals can include, for example, a system enable signal such as from an ignition switch on the vehicle 12. Such signals can additionally or alternatively include a system disable signal from a low oil level sensor, an engine over-temperature sensor, an engine control unit, or some other system present on the vehicle and designed to indicate a malfunction of the engine 40 or other system of the vehicle 12. In still another embodiment, such signals can be received from a wheel speed detector such that the controller 90 can determine if the vehicle 12 is moving, from a seat occupancy detector such that the controller 90 can determine if a driver and/or passenger are seated, and/or from a sensor configured to detect whether the utility bed 34 is in a dumping position or a cargo carrying position. It will therefore be appreciated that the controller 90 can be configured to receive any of a variety of signals from other components and systems on the vehicle, as appropriate, for the controller 90 to facilitate a desired operation of the auxiliary power generation system.

The control portion 90a of the controller 90 can also include one or more outputs for providing signals for control of associated devices. For example, in some embodiments, voltage and/or frequency of power generated by the generator 50 can vary substantially as the rotational speed of the rotor 63 of the generator 50 is altered. Accordingly, in order to ensure that the power receptacles 84 and 85 receive proper and consistent electrical power from the generator 50, one or more devices can be provided to regulate the rotational speed of the crankshaft 43 of the engine 40, such as to maintain the rotational speed of the rotor 63 in a desired operating range. For example, the controller 90 can be configured to monitor the rotational speed of the crankshaft 43 of the engine 40 and, in response, automatically adjust a throttle of the engine 40 in accordance with a program, to facilitate achievement of a desired rotational speed of the rotor 63.

In one embodiment, the controller 90 can be configured to adjust a throttle of the engine 40 and can accordingly be coupled with a throttle actuator 110. The throttle actuator 110 is shown in FIG. 7 to include a throttle actuator clutch 112 and a stepper motor 114. The throttle actuator clutch 112, when energized, can facilitate coupling of the stepper motor 114 with a throttle of the engine 40, such that operation of the stepper motor 114 results in increasing or decreasing a position of the throttle of the engine 40, and a resultant increase or decrease in a rotational speed of the crankshaft 43 of the engine 40. When the throttle actuator clutch 112 is disengaged, the stepper motor 114 can be uncoupled from the throttle of the engine 40, such that operation of the stepper motor 114 has no effect upon a position of the throttle of the engine 40, or resultant rotational speed of the crankshaft 43. In such an arrangement, uncoupling of the stepper motor 114 from the throttle by the throttle actuator clutch 112 can prevent backdriving of the stepper motor 114, and resultant wear on the stepper motor 114 or other throttle actuators (used to facilitate an operator's driving of the vehicle 12), during driving of the vehicle 12. It will be appreciated that, in other embodiments, the stepper motor 114 can be replaced with a servo motor, linear actuator, or other type of electromechanical actuator (e.g., electrically actuated pneumatic, hydraulic, or mechanical system). It will also be appreciated that, in other embodiments, an actuator clutch might not be provided, such that a stepper motor or other servo motor, linear actuator, or other type of electromechanical actuator, remains continually coupled with the throttle at all times during use of the vehicle.

The control portion 90a of the controller 90 can also be coupled with the clutch 61, and configured to provide power to the clutch 61 to facilitate selective coupling and uncoupling of the rotor 63 with the shaft 56 of the generator 50. One or more indicators 88 and 89, each such as a light emitting diode ("LED") or incandescent light bulb, for example, can also be coupled with the controller 90 to indicate an operational status of the controller 90. In one embodiment, the indicator 88 can be configured to indicate a fault condition of the auxiliary power generation system or vehicle 12, such as a low oil condition, for example. The indicator 89 can be configured to indicate when the clutch 61 is engaged, and/or when power is available for dispensation at the power receptacles 84 and 85. It will appreciated that fewer or additional indicators can be coupled with the controller and can be configured to provide any of a variety of additional or alternative information to an operator of the vehicle 12 and/or auxiliary power generation system as would be useful. In one embodiment, one or more of the indicators 88 and 89 can be configured to provide multiple pieces of information, such as by emitting one of a plurality of available colors and/or flashing patterns or codes.

The conditioning portion 90*b* of the controller 90 is shown in FIG. 8 to be coupled with each of the generator 50 and the power receptacles 84 and 85. More particularly, the conditioning portion 90*b* is shown in FIG. 8 to be connected with main windings 120 and 121 and a sub winding 123 of the generator 50. It will be appreciated that the generator can alternatively include any of a variety of different quantities or arrangements of windings. Upon receipt of electrical power from one or more of the windings (e.g., main windings 120 and 121) of the generator 50, the conditioning portion 90*b* can condition that electrical power into a form suitable for provision by way of the power receptacles 84 and 85.

One or more circuit protection devices can be provided to couple the power receptacles 84 and 85 with the conditioning portion 90*b* of the controller 90. Each of the circuit protection devices can be configured to selectively disrupt provision by the controller 90 of the conditioned electrical power to one or more of the power receptacles 84 and 85. For example, the circuit breaker 83 can protect the components of the auxiliary power generation system from an overload condition, and can also serve as a master disconnect. As another example, the circuit breaker 87 can prevent excessive current from being dispensed through the power receptacle 85. As yet another example, the ground fault circuit interrupter 86 can be configured to trip the circuit breaker 83 upon detection of a ground fault condition. The power receptacle 85 can also be provided with an integrated ground fault circuit interrupter. It will be appreciated that an auxiliary power generation system can include any of a variety of additional or alternative circuit protection devices.

Upon receipt of power from the generator 50, but prior to provision of conditioned electrical power to the power receptacles 84 and 85, the conditioning portion 90*b* can perform any of a variety of known conditioning processes. In one example, the conditioning portion 90*b* of the controller 90 can cooperate with the generator 50 to perform a conventional cycloconverter process, such as is described in U.S. Pat. No. 8,022,562, which is hereby expressly incorporated herein in its entirety. It will be appreciated that a cycloconverter process and associated circuitry can be smaller, lighter, simpler, less expensive, and/or can achieve superior performance in this application than can non-cycloconverter alternatives. However, it will be appreciated that, in other examples, a controller can comprise something other than a cycloconverter, such as for example an inverter that rectifies alternating current received from the generator into a direct current, and then converts the direct current into alternating current. It will be appreciated that a controller can condition the electrical power from the generator in any of a variety of alternative configurations or arrangements. It will also be appreciated that, in other embodiments, electrical power from a generator might not be conditioned prior to being provided to a power receptacle.

The power receptacles 84 and 85 can be generally configured to enable an operator to access electrical power for selectively powering an electrical device. Although the power receptacles can comprise virtually any type of electrical connector(s), in one embodiment, the power receptacle 84 is shown to comprise a twist-lock receptacle and the power receptacle 85 is shown to comprise a duplex receptacle, such as those commonly found within residential homes and commercial buildings. In one embodiment, the conditioned electrical power can comprise alternating current of between about 100 volts and about 500 volts and having a frequency of between about 40 hertz and about 70 hertz. More particularly, the conditioned electrical power can comprise alternating current of between about 110 volts and about 250 volts and having a frequency of between about 50 hertz and about 60 hertz. For example, conditioned electrical power provided to the power receptacles 84 and 85 can comprise alternating current of between about 110 volts and about 130 volts, and more particularly about 120 volts, and having a frequency of about 60 hertz, and can be available up to about 20 amperes, or at least about 1000 watts, or in some cases approximately 2500-3000 watts, or more. In other embodiments, conditioned electrical power provided to a power receptacle can comprise alternating current of between about 220 volts and about 240 volts and having a frequency of about 60 hertz, and can be available in one embodiment up to about 30 amperes, or approximately 7500 watts. It will be appreciated that the controller can provide the conditioned electrical power in any of a variety of other suitable voltages, frequencies, currents, and powers. For example, in alternate embodiments, one or more power receptacles can be configured to selectively provide about 12 volts direct current, about 24 volts alternating current, about 277 or 480 volts alternating current, three phase power, and/or any other voltage desirable for use by a consumer. Power from the power receptacles 84 and 85 can be used by an operator to power electrical devices such as sump pumps, fans, radios, refrigerators, portable heaters, air conditioners, dehumidifiers, furnace blowers, power tools, lamps, and many other consumer appliances, for example. While the vehicle 12 is shown to comprise two power receptacles (i.e., 84 and 85), with each being configured to dispense the same voltage, it will be appreciated that a vehicle can alternatively include fewer or more than two receptacles, and can alternatively simultaneously or selectively dispense more than one voltage.

In one embodiment, as described further below, whether the controller 90 provides the conditioned electrical power to the power receptacles 84 and 85, can be controlled by an operator's control of the operator control device 82. Whether the controller 90 provides the conditioned electrical power to the power receptacles 84 and 85, can also be in selective response to each of a parking brake signal from the parking brake switch 107, a gear position signal from the gear position switch 108, and an engine speed signal (such as can be determined by monitoring sparks of the spark plug 106). And, when the controller 90 provides power to the power receptacles 84 and 85, the controller 90 can, in one embodiment, control the rotational speed of the crankshaft 43 of the engine 40.

One method of operating the controller 90 will be described with respect to the flowchart shown in FIG. 9A. The method is shown to start at block 210. The controller 90 then proceeds to confirm occurrence of one or more first conditions. In one embodiment, the first conditions can include confirming actuation of the operator control device 82 by an operator (block 212), confirming that the transmission 42 is shifted in into a neutral position (by monitoring the gear position switch 108, at block 214), confirming that the parking brake is engaged (by monitoring the parking brake switch 107, at block 216), and/or confirming any of a variety of other conditions or diagnostics of the vehicle or auxiliary power generation system. In response to confirming each of the first conditions, the controller 90 can energize the throttle actuator clutch 112 (at block 218) and can determine whether a rotational speed of the crankshaft 43 of the engine 40 is within a first range (block 220). In one embodiment, the first range is between about 3500 revolutions per minute ("RPM") and about 3700 RPM, though it will be appreciated that, in alternative embodiments, the first range can be different.

When the rotational speed is not within the first range, the controller 90 can adjust a throttle of the engine 40, such as through use of the stepper motor 114, to result in the rotational speed approaching the first range, for example by decreasing (block 222) or increasing (block 224) a position of the throttle. When the rotational speed is within the first range, the controller 90 can cause the clutch 61 to engage (block 226), thereby rotationally coupling the crankshaft 43 with the rotor 63 of the generator 50. After or upon engagement of the clutch 61, the controller 90 can confirm occurrence of one or more second conditions. In one embodiment, the second conditions can include confirming actuation of the operator control device 82 by an operator (block 228), confirming that the transmission 42 is shifted in into a neutral position (by monitoring the gear position switch 108, at block 230), confirming that the parking brake is engaged (by monitoring the parking brake switch 107, at block 232), and/or confirming any of a variety of other conditions or diagnostics of the vehicle or auxiliary power generation system. The second conditions can also include a determination, by the controller 90, that the rotational speed is within another range (blocks 234 and 236), which in one embodiment can be between about 3450 RPM and about 3750 RPM, which is wider than the first range.

In response to confirming each of the second conditions, the controller 90 can determine whether the rotational speed of the crankshaft 43 of the engine 40 is within yet another range (block 238), which in this embodiment is shown to be the same as the first range (i.e., between about 3500 RPM and about 3700 RPM). When the rotational speed is not within the range of block 238, the controller 90 can adjust a throttle of the engine 40, such as through use of the stepper motor 114, to result in the rotational speed approaching the desired range, for example by decreasing (block 240) or increasing (block 242) a position of the throttle.

If, at any point prior to engaging the clutch 61, the controller 90 is unable to confirm occurrence of one or more of the first conditions, then the controller 90 can cease adjusting the throttle and can disengage the throttle actuator clutch 112, if engaged (see block 244). If, at any point following engaging the clutch 61, the controller 90 is unable to confirm occurrence of one or more of the second conditions, then the controller 90 can cease adjusting the throttle and can disengage the throttle actuator clutch 112, if engaged (see block 244), and can disengage the clutch 61, if engaged (block 246). If a wheel speed detector or an oil level or other engine fault detector, for example, is coupled with the controller (e.g., at auxiliary input 109), the controller 90 can consider corresponding signals to be among the first and/or second conditions, such that movement of the vehicle 12 or low oil level or another engine fault can result in the controller 90 disengaging the clutch 61 and thus stopping the production and dispensation of electric power from the generator 50. By ensuring that the parking brake of the vehicle 12 is engaged before allowing engagement (or continued engagement) of the clutch 61, the controller 90 can prevent dispensation of electrical power at the power receptacles 84 and 85 when the vehicle 12 is not stationary relative to the ground surface (e.g., 99). Thus, the vehicle 12 can be configured to prevent its simultaneous driving and provision of electrical power at the power receptacles (e.g., 84 and 85).

As previously indicated, the generator 50 can produce electrical power when the clutch 61 is engaged, and can provide that electrical power to the controller 90 for conditioning and provisioning to the power receptacles 84 and 85. It will be appreciated that the determination at step 220 can ensure that the rotational speed of the crankshaft 43 is within a generally adequate range to warrant engagement of the clutch 61, and production of power at the generator 50. Further, the determination at step 238 can ensure that the rotational speed of the crankshaft 43 remains within a generally adequate range during generator 50 operation, such as to account for changes in loading on the generator 50 and thus the engine 40 during an operator's powering of one or more electronic devices at the power receptacles 84 and 85.

Figure 9A:
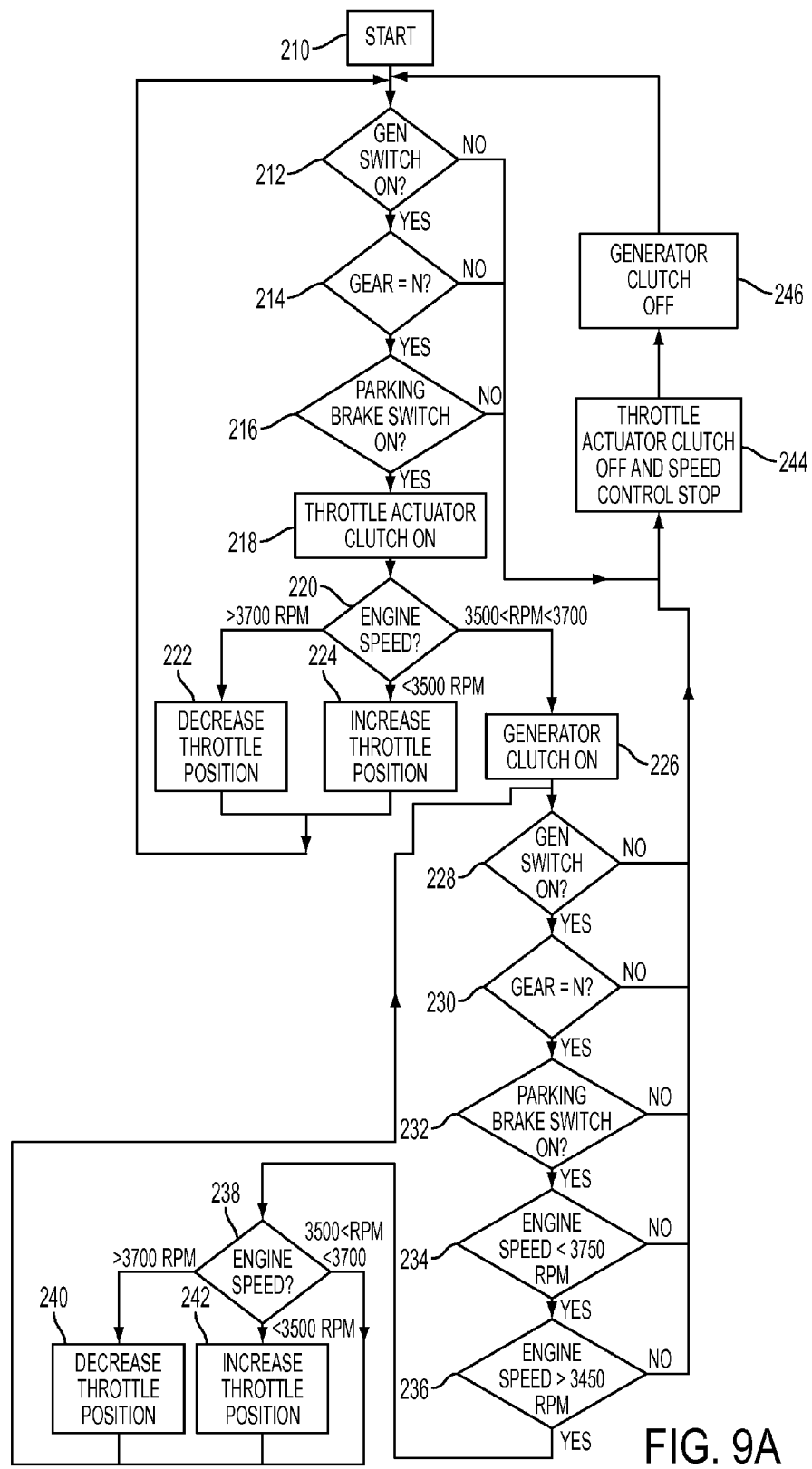
FIG. 9A is a block diagram depicting a method implemented by a controller of the power generation system of the vehicle of FIG. 1, in accordance with one embodiment.

In one embodiment, blocks 220, 222, and 224 can form a first engine control subroutine, and blocks 238, 240, and 242 can form a second engine control subroutine, with some or all of the remaining blocks of FIG. 9A forming a main routine. The determinations at steps 234 and 236 can result in an abort function, namely that the clutch 61 is disengaged, and power production from the generator 50 is ceased, if the rotational speed of the crankshaft 43 is insufficient or excessive, as may be caused by peak or other loading of the generator 50 and thus the engine 40. Thus, blocks 220 and 238 can establish normal operating speed ranges for the generator 50, and blocks 234 and 236 can establish abort speed ranges for the generator 50. It will be appreciated that the controller 90 can implement any of a variety of other steps, in addition or alternative to those depicted and described with respect to FIG. 8.

The controller 90 can accordingly include an electronic speed regulation system for the engine 40, which can automatically adjust the speed of the engine 40 such as in response to variations in electrical power output from the power receptacles 84 and 85. In one embodiment, the controller 90 can be adjustable, in hardware or software, in one or more respects. For example, the controller 90 can be configured such that the normal operating speed ranges in blocks 220 and/or 238 can be adjusted (shown generally by a potentiometer 92 in FIG. 7, which can be representative of a single potentiometer, a group of potentiometers, or software settings within the controller 90). As another example, the controller 90 can be configured such that abort speed ranges set by blocks 234 and/or 236 can be adjusted (shown generally by a potentiometer 94 in FIG. 7, which can be representative of a single potentiometer, a group of potentiometers, or software settings within the controller 90). As yet another example, the controller 90 can be configured such that the gain, offset and/or other characteristics of proportional-integral-derivative ("PID") control, as can be implemented by the controller 90 at blocks 222, 224, 240, and 242, can be adjusted to achieve an appropriate and effective time for response to a speed outside of the acceptable range at blocks 220 and 238 (shown generally by a potentiometer 96 in FIG. 7, which can be representative of a single potentiometer, a group of potentiometers, or software settings within the controller 90). Any of a variety of additional or alternative adjustments can be provided by a controller. In one embodiment, such adjustments of a controller 90 can be intended only for factory adjustment, though in other embodiments one or more of the adjustments might be capable or designed for operator adjustment.

The controller 90 can comprise analog circuitry and/or digital circuitry and, in one embodiment can comprise one or more microprocessors, capable of performing the functions described herein. For example, the conditioning portion 90b of the controller 90 can be configured to receive, for example, alternating current or direct current in virtually any voltage and/or frequency from the generator 50, and can provide a constant and regulated power supply to the power receptacles 84 and 85. The controller 90 can employ any of a variety of components to manipulate and/or condition that input power in order to provide a suitable voltage to the associated power receptacles 84 and 85. Such components can include thyristors, source controlled rectifiers, insulated gate bipolar transistors, other transistors, and/or other switching devices. Such components can additionally include diodes, capacitors, inductors and/or transformers to assist in conditioning, preventing electrical noise and/or for rectifying alternating current from the generator 50, along with one or more fuses, circuit breakers, disconnect switches, and/or other protective devices. Such components can further include any of a variety of electronic components (e.g., microprocessors, memory, controllers, etc.) for use in controlling these and other features of the auxiliary power generation system such as described above. In one embodiment, a microprocessor or other circuitry of the controller 90 can control the switching of transistors or other switching devices of the controller 90, such as by operation of gates and/or bases of the transistors. For example, by increasing the "on" time of the transistors, the amount of voltage generated at the power receptacles 84 and 85 can be increased.

Another method of operating a controller (e.g., 90) will be described with respect to the flowchart shown in FIG. 9B. The method is shown to start at block 410. The controller then proceeds to confirm occurrence of one or more conditions. In one embodiment, the conditions can include confirming actuation of an operator control device (e.g., 82) by an operator (block 412), confirming that a transmission (e.g., 42) is shifted in into a neutral position (by monitoring a gear position switch 108, at block 414), confirming that a parking brake is engaged (by monitoring a parking brake switch 107, at block 416), determining whether a rotational speed of a crankshaft (e.g., 43) is within a first range (e.g., in one embodiment, less than a threshold of about 3800 revolutions per minute, block 420), and/or confirming any of a variety of other conditions or diagnostics of the vehicle or auxiliary power generation system. In response to confirming each of the conditions, the controller can energize a throttle actuator clutch (e.g., 112, at block 418), and can cause a generator clutch (e.g., 61) to engage (block 426) thereby rotationally coupling the crankshaft with a rotor (e.g., 63) of a generator (e.g., 50). It will be appreciated that, in alternative embodiments, the threshold can be greater than, or less than, about 3800 revolutions per minute. After or upon engagement of the generator clutch, the controller can determine whether the rotational speed of the crankshaft of the engine is within a second range (block 438, shown to be between about 3500 RPM and about 3700 RPM). When the rotational speed is not within the range of block 438, the controller can adjust a throttle of the engine, such as through use of a stepper motor, to result in the rotational speed approaching the desired range, for example by decreasing (block 440) or increasing (block 442) a position of the throttle. If, at any point the controller is unable to confirm occurrence of one or more of the conditions, then the controller can cease adjusting the throttle and can disengage the throttle actuator clutch, if engaged (see block 444), and can disengage the generator clutch, if engaged (block 446).

Figure 9B:
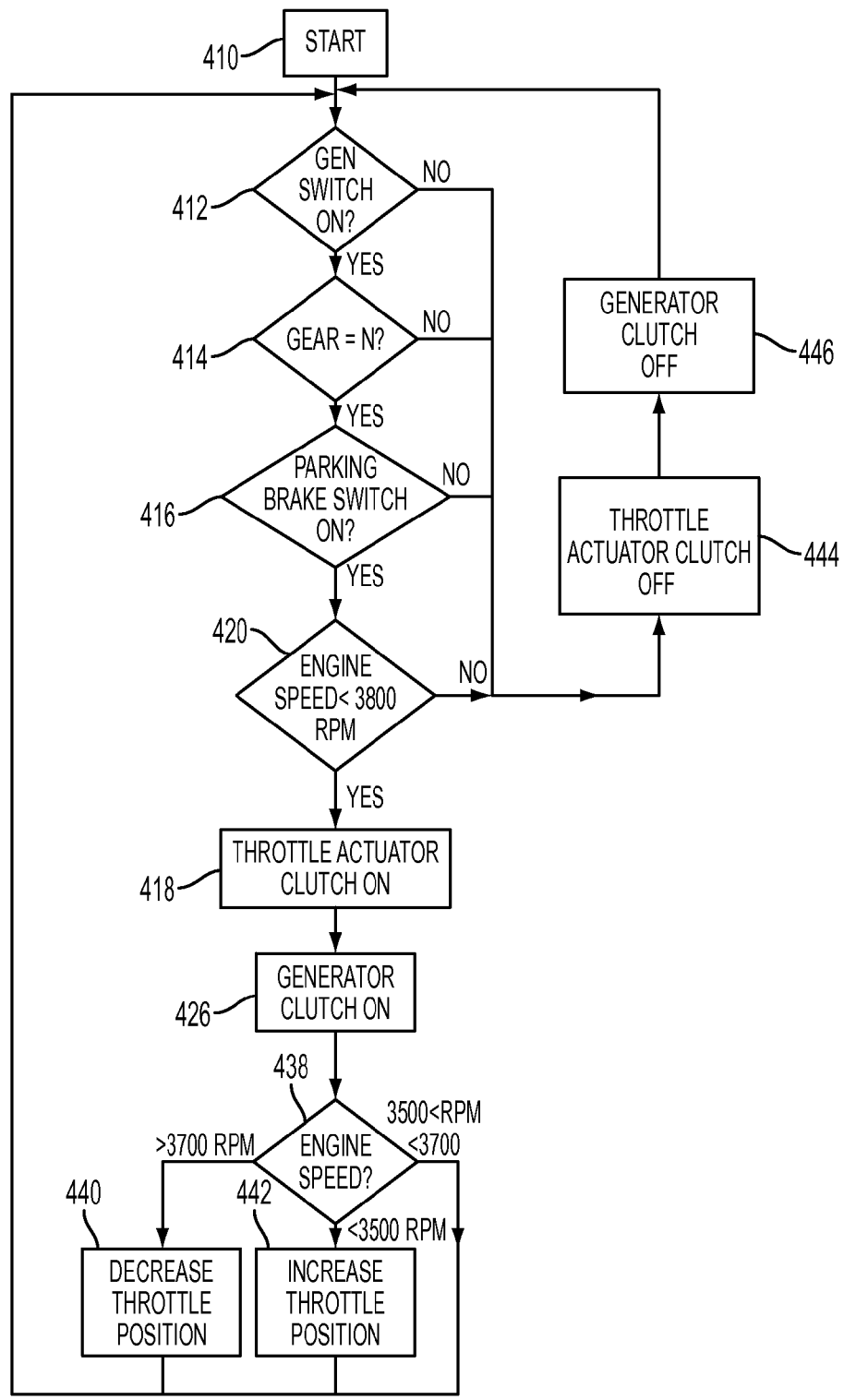
FIG. 9B is a block diagram depicting a method implemented by a controller of a power generation system of a vehicle, in accordance with another embodiment.

In accordance with the method of FIG. 9B, the generator can produce electrical power when the generator clutch is engaged, and can provide that electrical power to the controller for conditioning and provisioning to one or more power receptacles (e.g., 84 and 85). It will be appreciated that the determination at step 420 can ensure that the rotational speed of the crankshaft is within a generally adequate range to warrant engagement of the generator clutch 61, and production of power at the generator. Further, the determination at step 438 can ensure that the rotational speed of the crankshaft remains within a generally adequate range during generator operation, such as to account for changes in loading on the generator and thus the engine during an operator's powering of one or more electronic devices at the power receptacle(s).

By providing an auxiliary power generation system on a vehicle, such as described above, it will be appreciated that space, cost, and performance efficiencies can be achieved to benefit an operator, as compared with the operator having to purchase, store and operate both a vehicle and portable generator as separate items.

The foregoing description of embodiments and examples has been presented for purposes of illustration and description. It is not intended to be exhaustive or limiting to the forms described. Numerous modifications are possible in light of the above teachings. Some of those modifications have been discussed and others will be understood by those skilled in the art. The embodiments were chosen and described for illustration of various embodiments. The scope is, of course, not limited to the examples or embodiments set forth herein, but can be employed in any number of applications and equivalent devices by those of ordinary skill in the art. Rather it is hereby intended the scope be defined by the claims appended hereto.

What is claimed is:

1. A vehicle of comprising:
    a frame extending along a longitudinal axis from a front end to a rear end, the frame also extending laterally between a left side and a right side, the frame comprising a floor structure, the floor structure at least partially defining an occupant compartment;
    a left front wheel rotatably coupled to the left side adjacent to the front end;
    a right front wheel rotatably coupled to the right side adjacent to the front end;
    a left rear wheel rotatably coupled to the left side adjacent to the rear end;
    a right rear wheel rotatably coupled to the right side adjacent to the rear end;
    a utility bed coupled with the frame at a longitudinal position rearward of the driver seat and the passenger seat;
    a driver seat and a passenger seat, each being coupled with the frame alongside one another at a common longitudinal position relative to the frame within the occupant compartment, and with a first one of the driver seat and the passenger seat disposed adjacent to the left side, and with a second one of the driver seat and the passenger seat disposed adjacent to the right side;
    a steering wheel disposed within the occupant compartment and coupled with each of the left front wheel and the right front wheel, and configured to facilitate steering of the left front wheel and the right front wheel by a driver seated in the driver seat;
    an internal combustion engine coupled to the frame, and selectively drivingly coupled with at least one of the left front wheel, the right front wheel, the left rear wheel, and the right rear wheel to facilitate propulsion of the vehicle along a ground surface;
    a generator coupled with the internal combustion engine and configured to produce generated electrical power in response to operation of the internal combustion engine, the generator comprising a rotor, a stator, and a clutch configured to selectively disengage the rotor;
    a power receptacle;

an operator control device; and a controller coupled with each of the generator, the power receptacle, and the operator control device; wherein:

the controller is configured to receive the generated electrical power from the generator and to be controlled by the operator control device to provide conditioned electrical power to the power receptacle, the conditioned electrical power comprising alternating current of between about 100 volts and about 500 volts and having a frequency of between about 40 hertz and about 70 hertz;

the frame further comprises a roll cage;

the roll cage cooperates with the floor structure to define the occupant compartment; the utility bed is coupled with the frame at a longitudinal position rearward of the driver seat and the passenger seat; the utility bed comprises a cargo support surface configured to support cargo; and at least a portion of the engine is disposed beneath the driver seat and the passenger seat and at a lateral position relative to the frame generally midway between the left side and the right side;

the rotor has a rotational axis;

the rotational axis is parallel with the longitudinal axis;

at least a portion of the generator is disposed beneath the cargo support surface; and the generator is disposed at a lateral position relative to the frame generally midway between the left side and the right side.

2. The vehicle of claim 1 wherein the vehicle further comprises a utility bed, wherein the utility bed is movably coupled with the frame such that the utility bed is pivotable between a dumping position and a cargo carrying position.

3. The vehicle of claim 1 wherein:

the generator is disposed at a longitudinal position relative to the frame rearward of the driver seat; and the generator is disposed at a lateral position relative to the frame generally midway between the left side and the right side.

4. The vehicle of claim 1 wherein the controller is configured to adjust a throttle of the internal combustion engine.

5. The vehicle of claim 4 wherein the controller is further configured to receive, and provide the conditioned electrical power to the power receptacle in selective response to, each of a parking brake signal, a gear position signal, and an engine speed signal.

6. The vehicle of claim 1 wherein the conditioned electrical power comprises a voltage of between about 110 volts and about 130 volts, and a frequency of about 60 hertz, and is at least about 1000 watts.

7. The vehicle of claim 1 further comprising a body and a generator control panel, wherein:

the body comprises a plurality of body panels each being attached to the frame;

the generator control panel is attached to at least one of the frame and the body;

the generator control panel supports each of the power receptacle, the operator control device, and at least one circuit protection device; and each of the at least one circuit protection device is configured to selectively disrupt provision by the controller of the conditioned electrical power to the power receptacle.

8. The vehicle of claim 7 wherein:

at least one of the body and the frame defines an opening to facilitate ingress and egress of at least one of a driver and a passenger relative to the occupant compartment;

the opening is disposed at a longitudinal position relative to the frame generally midway between the front end and the rear end; and the generator control panel is disposed adjacent to the opening and at a longitudinal position rearward of a corresponding vertical portion of the opening, and generally beside and laterally outwardly of one of the driver seat and the passenger seat.

9. The vehicle of claim 8 further comprising a blocking member configured to selectively block at least a portion of the opening to prevent ingress and egress of at least one of a driver and a passenger relative to the occupant compartment, and wherein the generator control panel is disposed adjacent to and at a longitudinal position rearward of the blocking member when the blocking member is in a closed position.

10. The vehicle of claim 8 further comprising a utility bed coupled with the frame at a longitudinal position rearward of the driver seat and the passenger seat, wherein:

the driver seat comprises a seating surface extending along a support plane and configured to support a seated driver;

the floor structure comprises a floor surface extending along a floor plane and configured to support feet of a driver seated in the driver seat;

the support plane and the floor plane are generally horizontal and parallel with one another;

the generator control panel is disposed at a longitudinal position entirely forward of the utility bed; and the generator control panel is disposed at a vertical position at least substantially entirely above the floor plane and at least substantially entirely beneath the support plane.

11. A vehicle comprising:

a frame extending along a longitudinal axis from a front end to a rear end, the frame also extending laterally between a left side and a right side, the frame comprising a floor structure, the floor structure at least partially defining an occupant compartment;

a left front wheel rotatably coupled to the left side adjacent to the front end;

a right front wheel rotatably coupled to the right side adjacent to the front end;

a left rear wheel rotatably coupled to the left side adjacent to the rear end;

a right rear wheel rotatably coupled to the right side adjacent to the rear end;

a driver seat and a passenger seat, each being coupled with the frame alongside one another at a common longitudinal position relative to the frame within the occupant compartment, and with a first one of the driver seat and the passenger seat disposed adjacent to the left side, and with a second one of the driver seat and the passenger seat disposed adjacent to the right side;

a steering wheel disposed within the occupant compartment and coupled with each of the left front wheel and the right front wheel, and configured to facilitate steering of the left front wheel and the right front wheel by a driver seated in the driver seat;

an internal combustion engine coupled to the frame, and selectively drivingly coupled with at least one of the left front wheel, the right front wheel, the left rear wheel, and the right rear wheel to facilitate propulsion of the vehicle along a ground surface;

a generator coupled with the internal combustion engine and configured to produce generated electrical power in response to operation of the internal combustion engine, the generator comprising a rotor, a stator, and a clutch configured to selectively disengage the rotor;

a power receptacle;
an operator control device; and
a controller coupled with each of the generator, the power receptacle, and the operator control device; wherein:
the controller is configured to receive the generated electrical power from the generator and to be controlled by the operator control device to provide conditioned electrical power to the power receptacle, the conditioned electrical power comprising alternating current of between about 100 volts and about 500 volts and having a frequency of between about 40 hertz and about 70 hertz;
the internal combustion engine comprises an engine block and a power take off;
the generator further comprises a shaft, a housing, and a first bearing;
the shaft extends between a first end and a second end;
the housing comprises an end plate and a side wall structure;
the first bearing couples the first end of the shaft with the end plate;
the housing is bolted to the engine block such that the second end of the shaft is coupled with the power take off;
the rotor is rotatable relative to the housing and defines a rotor bore;
the stator is fixed relative to the housing and defines a stator bore;
the shaft extends through each of the rotor bore and the stator bore;
at least one of the rotor and the stator is disposed adjacent to the second end of the shaft;
the clutch comprises an electromagnetic clutch and is disposed adjacent to the first end of the shaft; and
the clutch is coupled with each of the shaft and the rotor, and is configured to selectively engage the shaft with the rotor.

12. The vehicle of claim 11 wherein:
the generator further comprises a fan disposed adjacent to the first end of the shaft and coupled with each of the clutch and the rotor; and
the stator is disposed at least substantially within the rotor bore, concentrically between the shaft and the rotor.

13. The vehicle of claim 12 wherein:
the housing further comprises a mounting plate;
the side wall structure extends between and contacts each of the end plate and the mounting plate;
the generator further comprises a second bearing;
the second bearing couples the second end of the shaft with the mounting plate;
the power take off comprises a portion of a crankshaft of the internal combustion engine; and
the mounting plate contacts the engine block.

14. The vehicle of claim 13 wherein:
the rotor has a rotational axis;
the portion of the crankshaft is rotatable about the rotational axis; and
the rotational axis is parallel with the longitudinal axis.

15. A vehicle comprising:
an internal combustion engine comprising an engine block and a power take off, the internal combustion engine facilitating propulsion of the vehicle along a ground surface;
a generator coupled with the internal combustion engine and configured to produce generated electrical power in response to operation of the internal combustion engine, the generator comprising a shaft, a housing, a rotor, a stator, and a clutch configured to selectively disengage the rotor;
a power receptacle; and
a controller coupled with each of the generator and the power receptacle; wherein:
the controller is configured to receive the generated electrical power from the generator and to facilitate provision of conditioned electrical power to the power receptacle;
the housing is bolted to the engine block such that one end of the shaft is coupled with the power take off;
the rotor is rotatable relative to the housing and defines a rotor bore;
the stator is fixed relative to the housing and defines a stator bore;
the shaft extends through each of the rotor bore and the stator bore;
the clutch comprises an electromagnetic clutch and is disposed adjacent to another end of the shaft; and
the clutch is coupled with each of the shaft and the rotor, and is configured to selectively engage the shaft with the rotor.

* * * * *

UNITED STATES PATENT AND TRADEMARK OFFICE
CERTIFICATE OF CORRECTION

PATENT NO.           : 8,985,253 B2                                        Page 1 of 1
APPLICATION NO.      : 13/759136
DATED                : March 24, 2015
INVENTOR(S)          : Stephen F. Winter et al.

It is certified that error appears in the above-identified patent and that said Letters Patent is hereby corrected as shown below:

In the claims,

Claim 1, column 16, lines 43-51, should be changed as set forth below:

a driver seat and a passenger seat, each being coupled with the frame
      alongside one another at a common longitudinal position relative to the
      frame within the occupant compartment, and with a first one of the driver
      seat and the passenger seat disposed adjacent to the left side, and with
      a second one of the driver seat and the passenger seat disposed
      adjacent to the right side;
    a utility bed coupled with the frame at a longitudinal position rearward of
      the driver seat and the passenger seat;

Claim 1, column 17, lines 14-16, delete the following: "the utility bed is coupled with the frame at a longitudinal position rearward of the driver seat and the passenger seat;"

Signed and Sealed this
Nineteenth Day of January, 2016

Michelle K. Lee
*Director of the United States Patent and Trademark Office*